(12) United States Patent
Tazaki et al.

(10) Patent No.: US 7,887,125 B2
(45) Date of Patent: Feb. 15, 2011

(54) GRID MEMBER AND VEHICLE FRONT STRUCTURE WITH THE GRID MEMBER

(75) Inventors: Yuichi Tazaki, Kanagawa (JP); Mayumi Endou, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 390 days.

(21) Appl. No.: 11/955,977

(22) Filed: Dec. 13, 2007

(65) Prior Publication Data

US 2008/0157566 A1 Jul. 3, 2008

(30) Foreign Application Priority Data

Dec. 28, 2006 (JP) .............................. 2006-355212
Oct. 19, 2007 (JP) .............................. 2007-272397

(51) Int. Cl.
*B60R 19/52* (2006.01)
(52) U.S. Cl. .............................. 296/193.1; 296/187.09; 296/193.09
(58) Field of Classification Search .............. 296/193.1, 296/193.09, 187.09, 203.02, 187.03, 187.05, 296/187.04; 293/115; 180/68.6
See application file for complete search history.

(56) References Cited

U.S. PATENT DOCUMENTS

| 2,007,716 | A | * | 7/1935 | Green ........................ 52/668 |
| 2,008,907 | A | * | 7/1935 | Green ........................ 52/668 |
| 4,169,501 | A | * | 10/1979 | Takeuchi et al. ............. 165/126 |
| 4,424,996 | A | * | 1/1984 | Yoshiyuki ................... 293/117 |
| 5,452,931 | A | * | 9/1995 | Chase ........................ 293/115 |
| 5,478,127 | A | * | 12/1995 | Chase ........................ 293/115 |
| 5,660,426 | A | * | 8/1997 | Sugimori et al. ........ 296/187.05 |
| 5,887,672 | A | * | 3/1999 | Kimura ..................... 180/68.1 |

(Continued)

FOREIGN PATENT DOCUMENTS

| DE | 10238445 | 3/2004 |
| JP | 2005-212631 | 8/2005 |

OTHER PUBLICATIONS

English Patent Abstract of JP2005-212631 from Industrial Property Digital Library -PAJ published Aug. 11, 2005, 2 pages.

(Continued)

*Primary Examiner*—Glenn Dayoan
*Assistant Examiner*—Gregory Blankenship
(74) *Attorney, Agent, or Firm*—Osha Liang LLP

(57) ABSTRACT

A front structure for a vehicle has a grid member configured to allow outside air to be introduced from a forward direction of the vehicle into a compartment of the vehicle, and a part within the compartment disposed on a rear side of the grid member. The grid member has a first bridge and a second bridge intersecting with the first bridge. One of the first bridge and the second bridge has a bridge upper portion having a fragile portion on one of a front side thereof and a rear side thereof in a fore-and-aft direction of the vehicle, and a bridge lower portion having a fragile portion on one of a front side thereof and a rear side thereof in the fore-and-aft direction. The fragile portion of the bridge upper portion and the fragile portion of the bridge bottom portion are on opposite sides in the fore-and-aft direction.

21 Claims, 21 Drawing Sheets

U.S. PATENT DOCUMENTS

| | | | |
|---|---|---|---|
| 6,854,545 B1 * | 2/2005 | Elwell et al. | 180/68.6 |
| 7,044,517 B2 * | 5/2006 | Hyuga | 296/193.1 |
| 7,090,265 B2 * | 8/2006 | Otte | 293/115 |
| 7,290,830 B2 * | 11/2007 | Rester et al. | 296/193.1 |
| 7,455,351 B2 * | 11/2008 | Nakayama et al. | 296/193.1 |
| 7,461,875 B2 * | 12/2008 | Kobayashi et al. | 293/115 |
| 7,520,561 B2 * | 4/2009 | Nakamae et al. | 296/193.09 |
| 7,581,607 B2 * | 9/2009 | Moen et al. | 180/68.6 |
| 2004/0178664 A1 * | 9/2004 | Hyuga | 296/193.1 |
| 2005/0120537 A1 * | 6/2005 | Rester et al. | 29/453 |
| 2007/0080009 A1 * | 4/2007 | Kowalski | 180/68.6 |
| 2008/0157566 A1 * | 7/2008 | Tazaki et al. | 296/193.1 |

OTHER PUBLICATIONS

European Search Report for European Applicaiton No. 07150191.0-1264, dated Oct. 23, 2009 (7 pages).

English Patent Abstract of DE10238445 from esp@cenet, published Mar. 4, 2004 (1 page).

Office Action in European Patent Application No. 07150191.0-1264, dated Jul. 9, 2010 (7 pages).

Office Action in Chinese Application No. 200710161051.2, dated Jun. 22, 2010 (5 pages).

\* cited by examiner

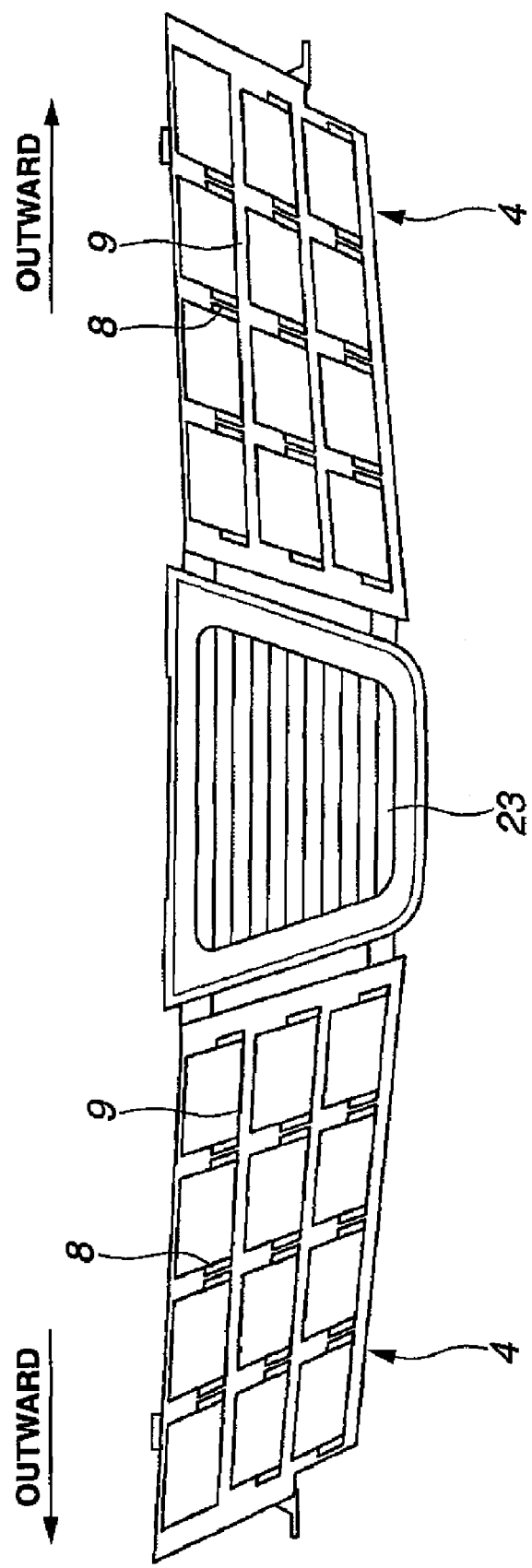

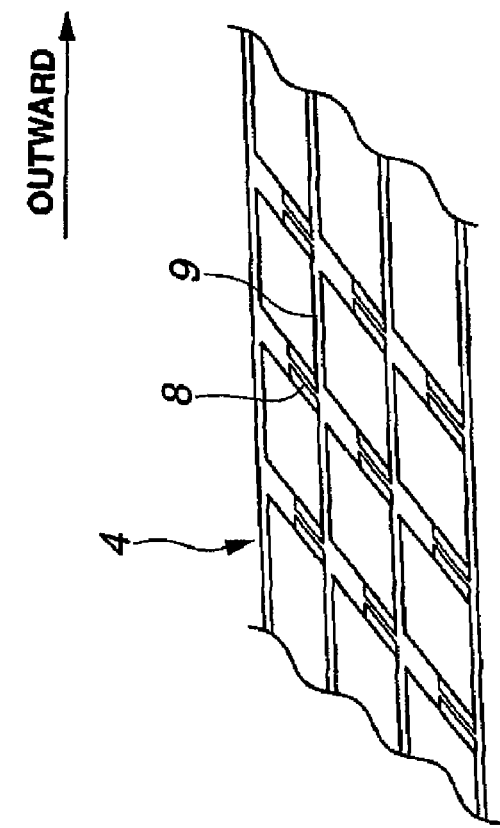
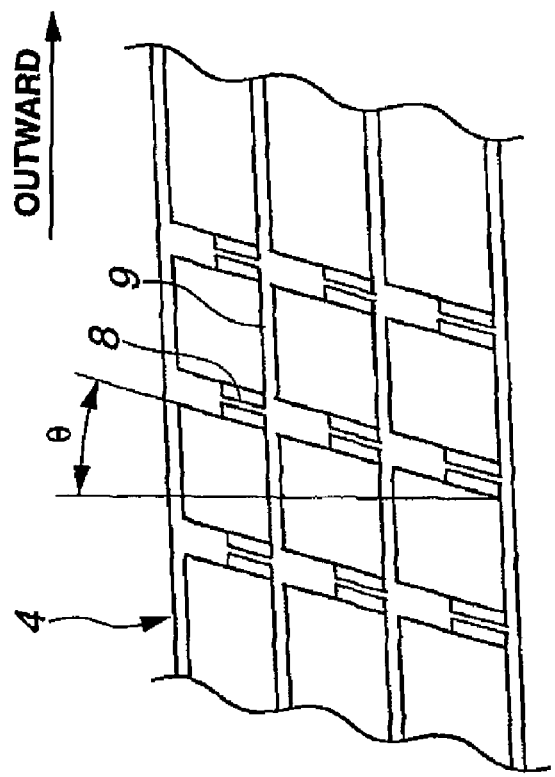

GRID MEMBER AND VEHICLE FRONT STRUCTURE WITH THE GRID MEMBER

PRIORITY APPLICATION

This application claims priority to Japanese Patent Application No. 2006-355212, filed on Dec. 28, 2006 and Japanese Patent Application No. 2007-272397, filed on Oct. 19, 2007. The entire disclosure of Japanese Patent Application No. 2006-355212 and Japanese Patent Application No. 2007-272397 are hereby incorporated herein by reference.

BACKGROUND OF INVENTION

1. Field of the Invention

The present invention relates to a grid member that is disposed at a front portion of a vehicle in order to introduce outside air into an engine compartment and having two bridges intersecting each other, and further relates to a vehicle front structure with the grid member.

2. Description of the Related Art

A conventional front structure of a vehicle is disclosed in Japanese Patent Provisional Publication No. 2005-212631. The conventional front structure includes an outside air introducing port for introducing an outside air into an inside of an engine compartment as a compartment that accommodates an engine. In general the outside air introducing port is constructed by a bridge that is formed on a fascia and extends substantially parallel to a fore-and-aft direction of the vehicle. Alternatively, the outside air introducing port is constructed by a dedicated part with a bridge independent of the fascia.

SUMMARY OF THE INVENTION

When an external force is applied to a conventional front structure of a vehicle from a forward direction, the bridge is urged in a rearward direction while staying substantially horizontal. A rear end portion of the bridge is brought into contact with a part within the engine compartment of the vehicle, such as a heat exchanger, disposed on a rear side of the rear end portion within the engine compartment. The external force from the forward direction is transmitted to the part through the substantially horizontal bridge which comes in contact with the part. This tends to result in damage to the part within the engine compartment.

In one or more embodiments of the present invention, a grid member includes a substantially horizontally extending bridge and can reduce damage to a part within a vehicle engine compartment even when a rear end portion of the bridge in the substantially horizontal state is brought into contact with the part due to an external force applied to the bridge from a forward direction of the vehicle, and provide a vehicle front structure with the grid member.

Other aspects and advantages of the invention will be apparent from the following description and the appended claims.

BRIEF DESCRIPTION OF DRAWINGS

FIG. 9 is a front view of the grille reinforcement members of the vehicle front structure of the first embodiment of the invention which are disposed on both sides of an ornament supporting member.

FIG. 10A and FIG. 10B are diagrams showing that when a vertical bridge of the grille reinforcement member of the vehicle front structure of the first embodiment of the invention is inclined toward an outside of the vehicle, the grille reinforcement member is deformed toward the outside of the vehicle.

DETAILED DESCRIPTION

Figure 1:
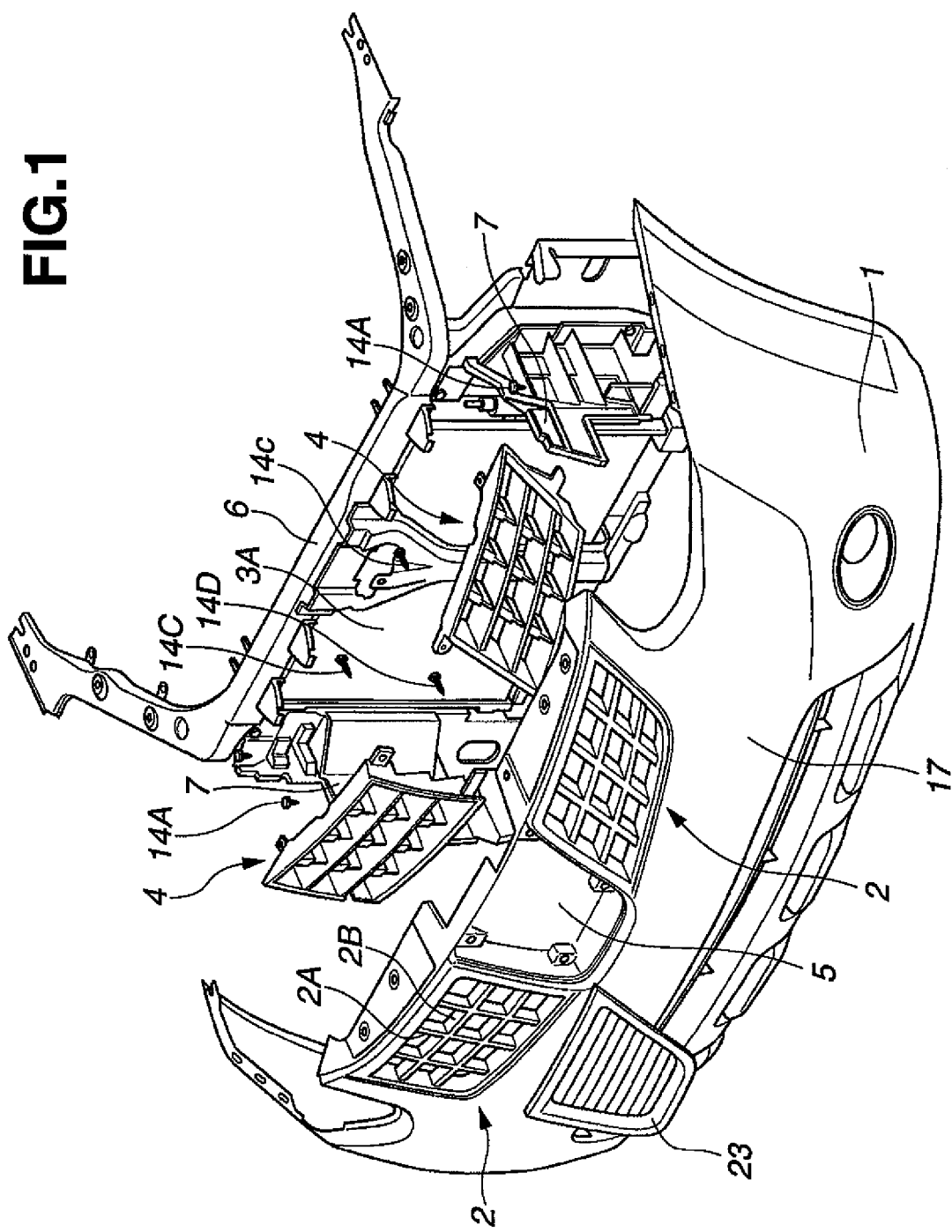
FIG. 1 is an exploded perspective view of a vehicle front structure of a first embodiment of the invention.
Figure 2:
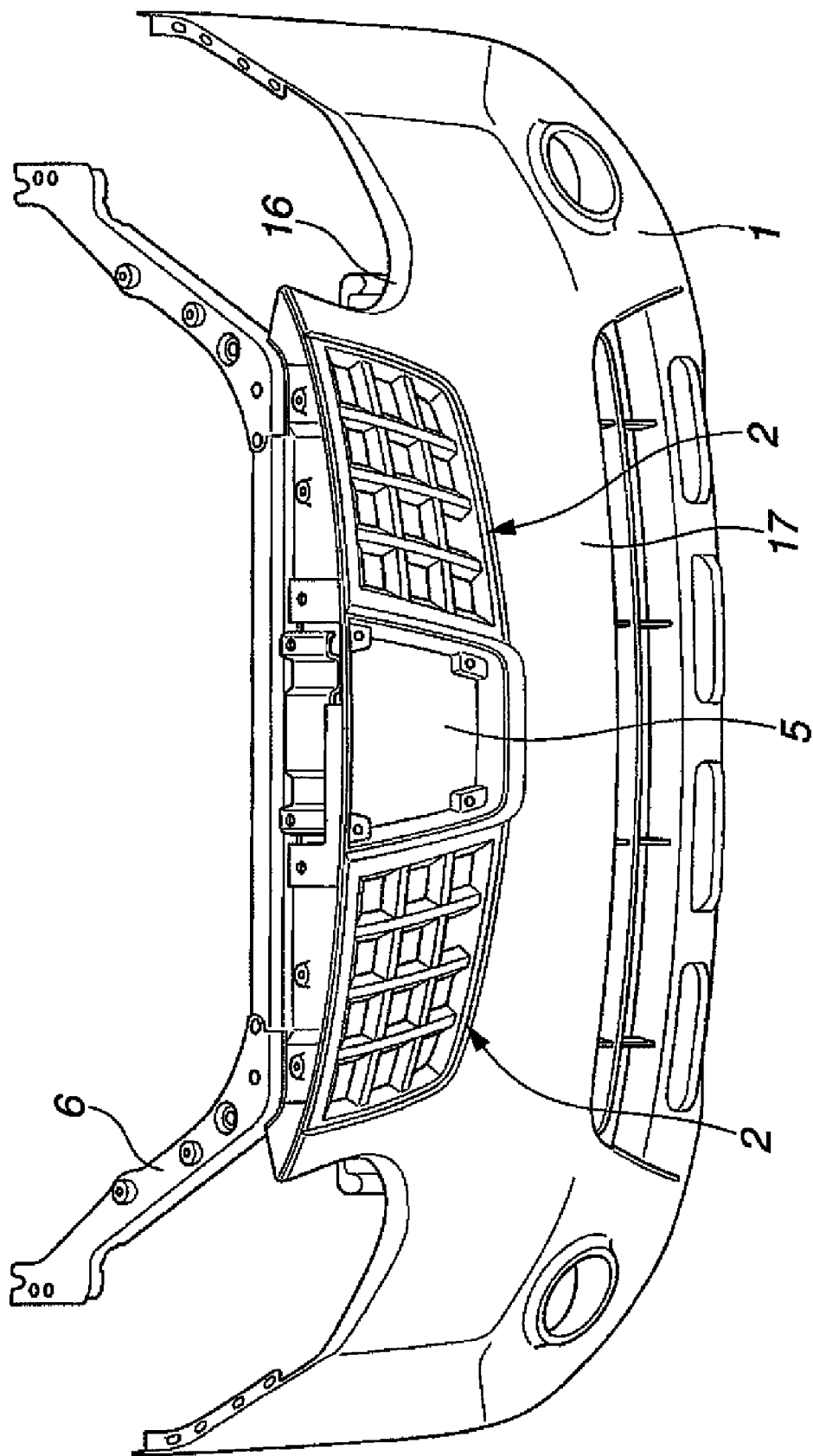
FIG. 2 is a front view of the vehicle front structure of the first embodiment of the invention.
Figure 3:
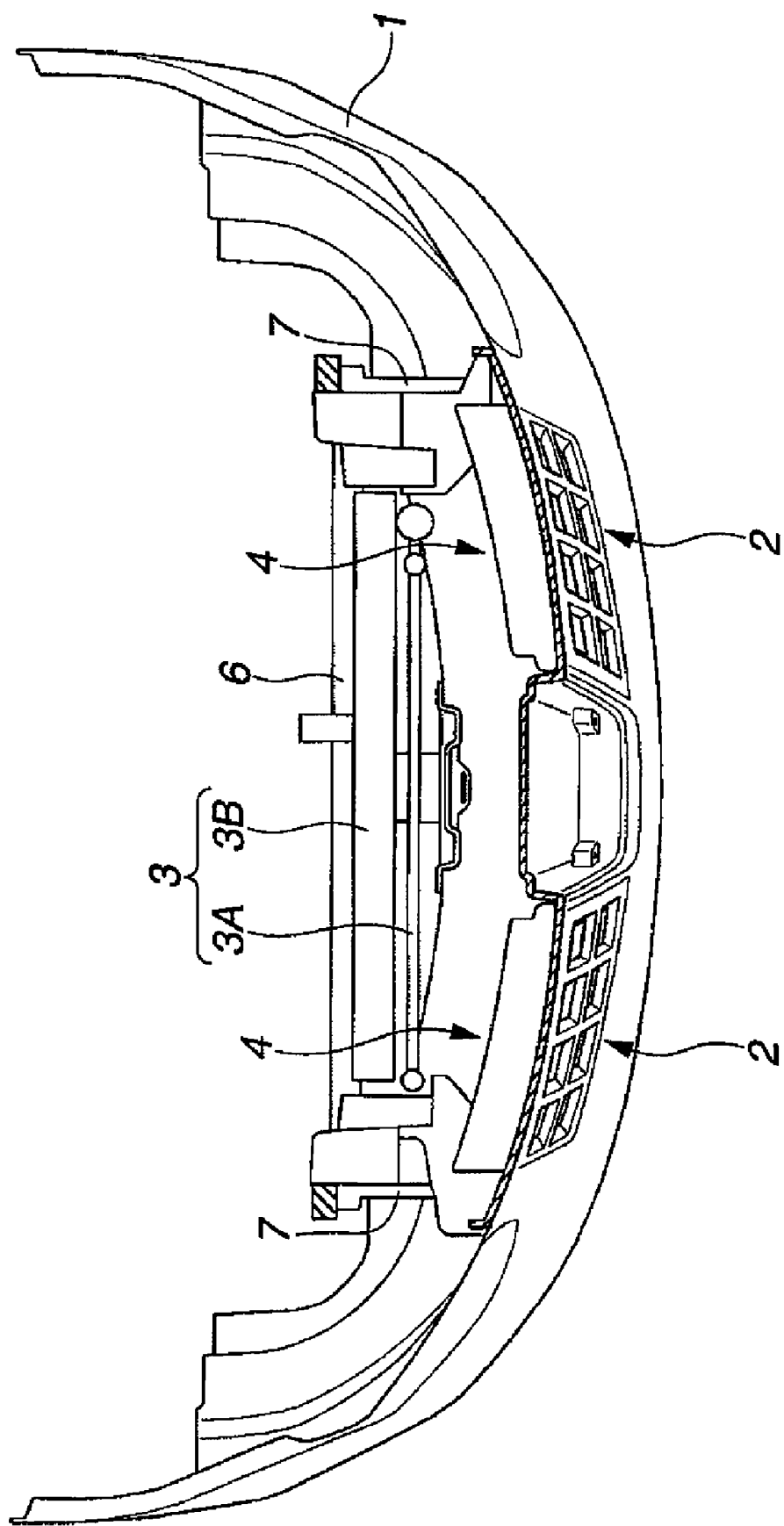
FIG. 3 is a plan view of the vehicle front structure of the first embodiment of the invention.
Figure 4:
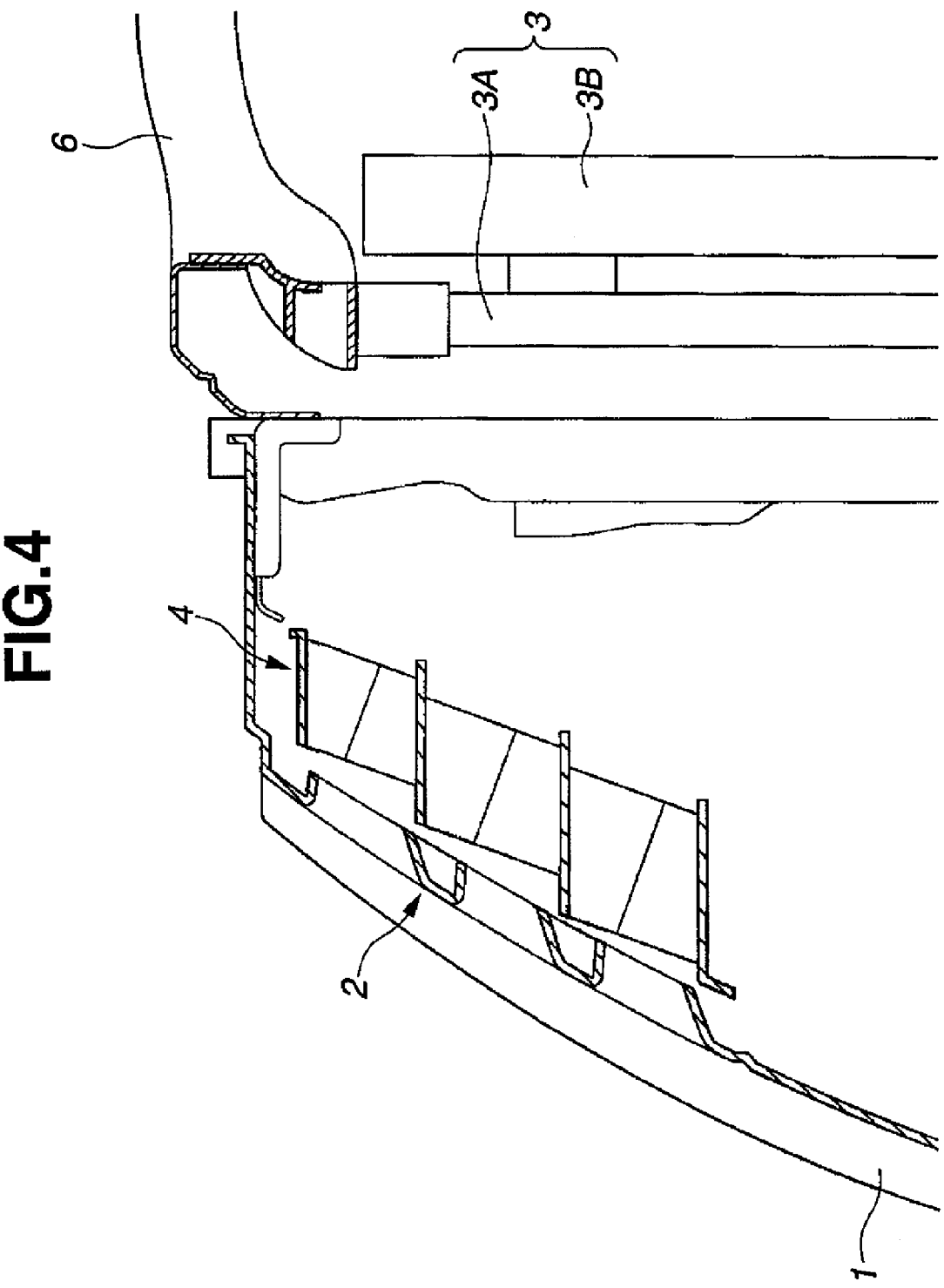
FIG. 4 is an enlarged section of an essential part of the vehicle front structure of the first embodiment of the invention.

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 to FIG. 16 are diagrams showing a vehicle front structure of a first embodiment of the invention.

As shown in FIG. 1 to FIG. 4, the vehicle front structure includes grille 2 formed on fascia 1, heat exchanger 3 disposed on a rear side of grille 2, and grille reinforcement members 4 disposed near grille 2 on a front side of heat exchanger 3. Fascia 1 serves as a support member for grille reinforcement members 4. Grille 2 serves as an outside air introducing portion. Heat exchanger 3 is a part disposed within an engine compartment and includes condenser 3A and radiator 3B. Each of grille reinforcement members 4 is a grid member.

The fascia 1 is constructed to cover vehicle body parts which include a bumper reinforcement, not shown, that is disposed on a front side of the engine compartment. Fascia 1 includes a bumper 17 that extends in a width direction of the vehicle so as to cover the bumper reinforcement and serves as a projection that projects in a forward direction of the vehicle. The fascia 1 also includes the grille 2 that is formed above the bumper 17 and at a central portion of the fascia 1 in the width direction of the vehicle. The fascia 1 also includes a lamp mounting portions 16 that are cut out in order to accommodate lamps on both outer-end portions of the grille 2 in the width direction of the vehicle.

The grille 2 has an ornament supporting portion 5 at a central portion thereof which supports an ornament member 23. The grille 2 is constructed to sandwich the ornament supporting portion 5 between left and right portions of the grille 2 in the width direction of the vehicle. The grille 2 is formed into a grid shape and includes vertical bridges 2A and lateral bridges 2B which cooperate with each other to form the grid shape. The grille 2 serves as an outside air introducing part which allows outside air to be introduced into the engine compartment.

The heat exchanger 3 is fixed to a radiator core 6. Specifically, a condenser 3A and a radiator 3B are fixed to the radiator core 6 from a front side of the vehicle toward a rear side of the vehicle. The grille 2 is located forward of the heat exchanger 3 in substantial alignment therewith and serves to supply the heat exchanger 3 with outside air.

Air guide members 7 also are fixed to the radiator core 6, and serve to efficiently introduce outside air to the heat exchanger 3. The air guide members 7 are respectively mounted to both sides of the heat exchanger 3 in the width direction of the vehicle. The air guide members 7 are disposed substantially on lines extending along outside surfaces of the grille reinforcement members 4 (as explained later) which are spaced from each other in the width direction of the vehicle. The air guide members 7 serve to restrain the outside air from leaking to parts other than the heat exchanger 3.

Figure 5:
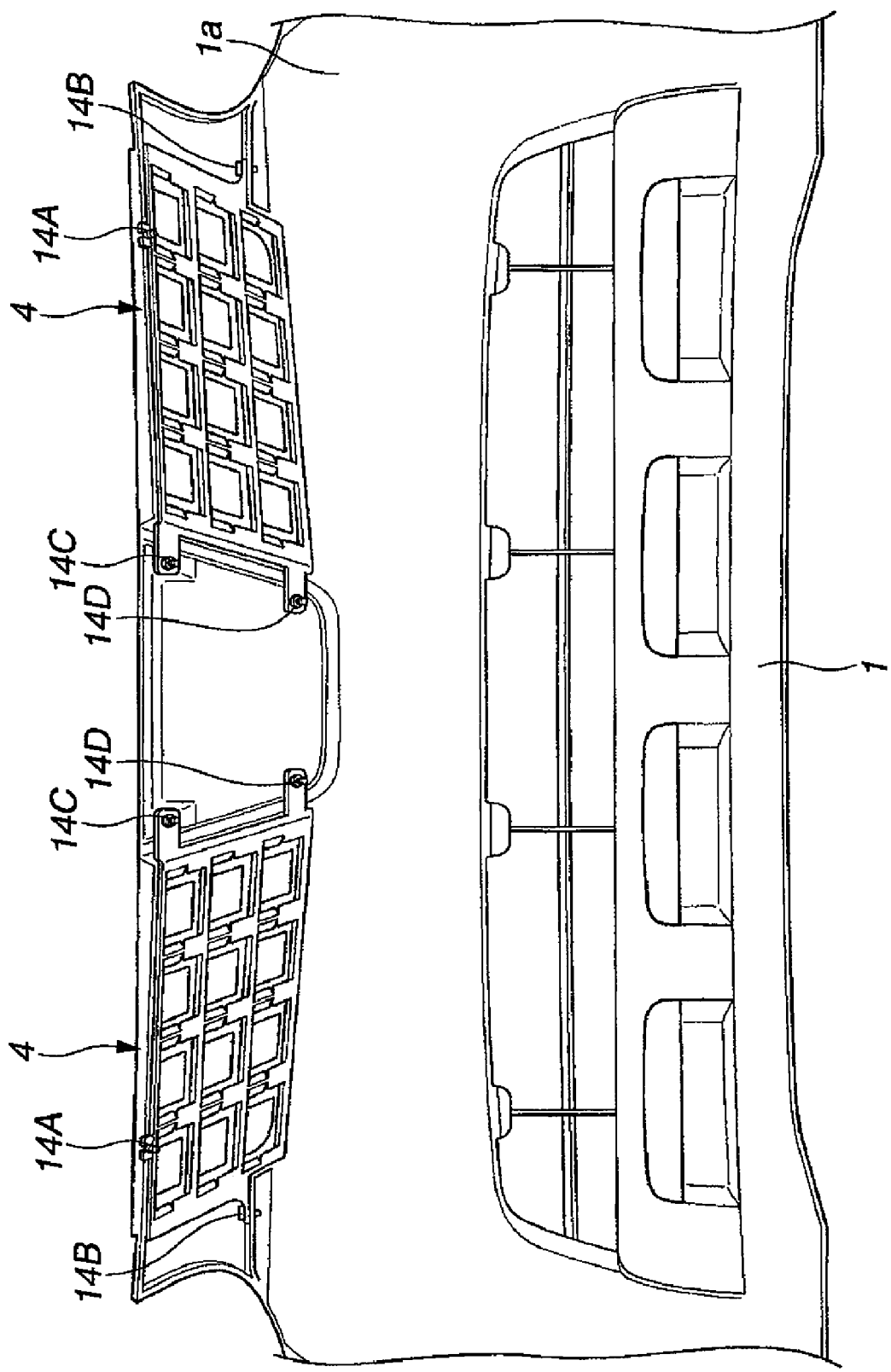
FIG. 5 is a diagram showing grille reinforcement members that are mounted to a fascia of the vehicle front structure of the first embodiment of the invention.
Figure 6:
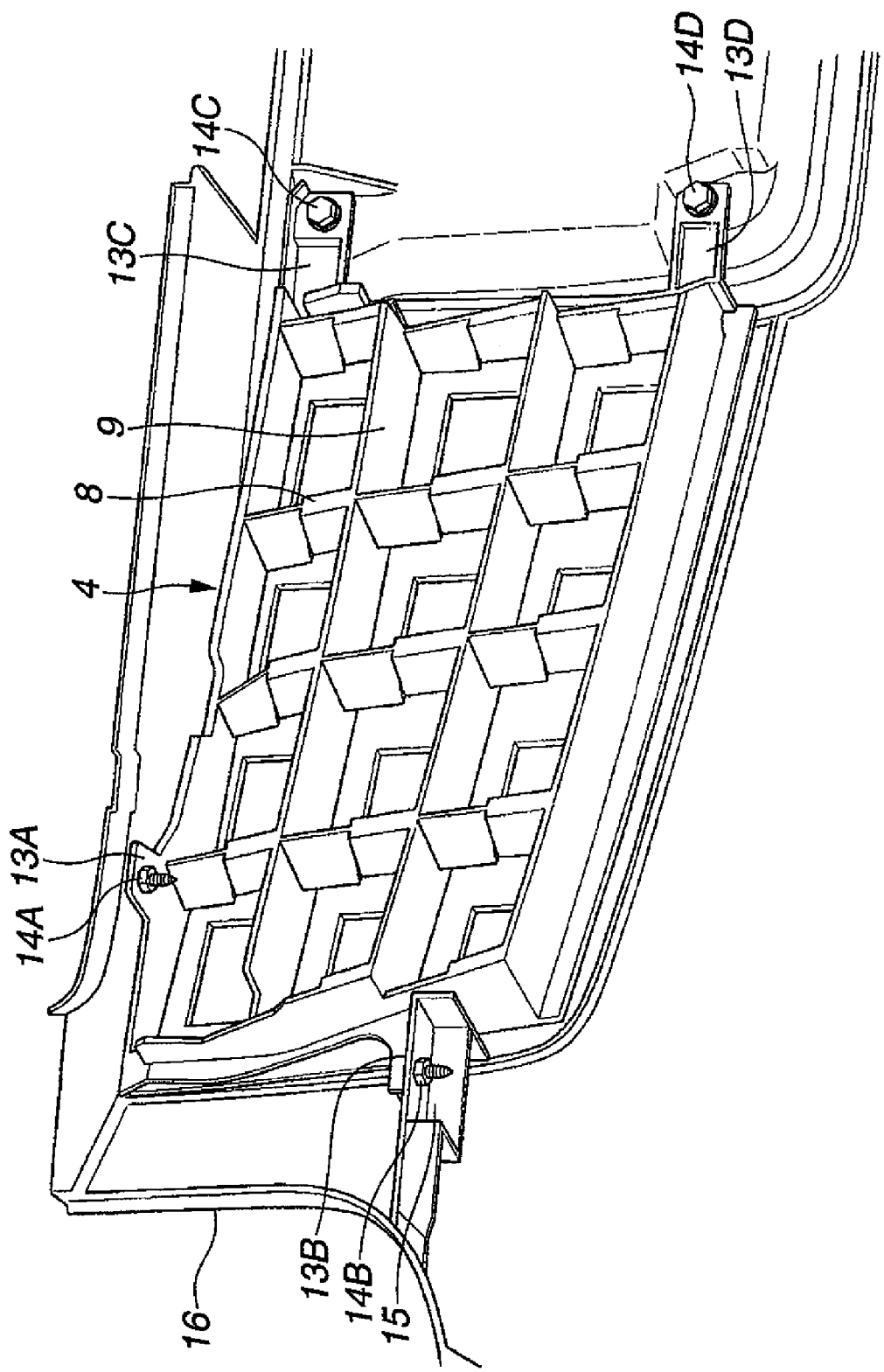
FIG. 6 is an enlarged perspective view of an essential part of the grille reinforcement member that is mounted to the fascia of the vehicle front structure of the first embodiment of the invention.
Figure 7:
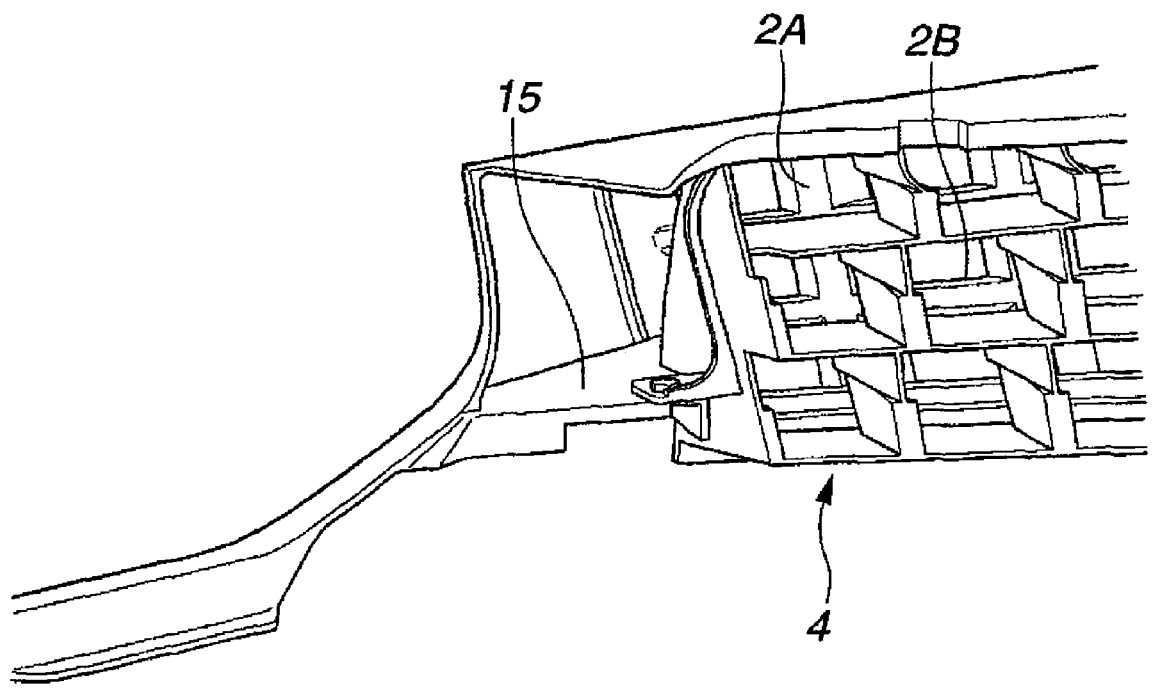
FIG. 7 is a rear view of the fascia of the vehicle front structure of the first embodiment of the invention and shows a rib that is formed at a fragile portion of the fascia.

As shown in FIG. 5 to FIG. 7, the grille reinforcement members 4 are mounted to a rear surface 1a of the fascia 1 opposing the grille 2. The grille reinforcement members 4 are separate parts independent of the fascia 1. The grille reinforcement members 4 are respectively disposed on right and left sides of the vehicle, between which the ornament supporting portion 5 of the grille 2 is interposed. For simplicity, the grille reinforcement member 4 on the right side of the vehicle is hereinafter referred to as a right grille reinforcement member 4 and the grille reinforcement member 4 on the left side of the vehicle is hereinafter referred to as a left grille reinforcement member 4.

Figure 8A:
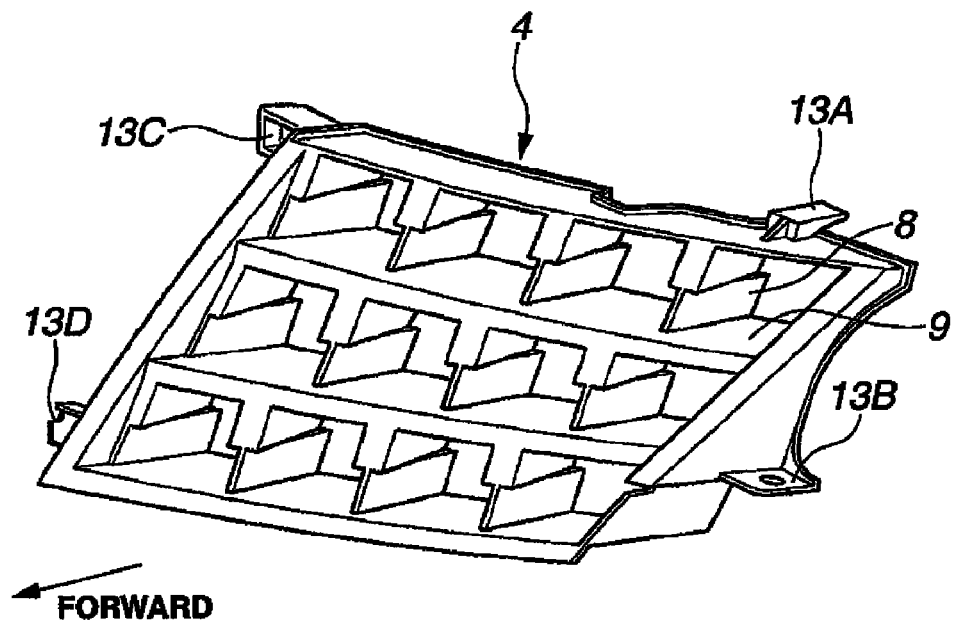
FIG. 8A and FIG. 8B are perspective views of the left and right grille reinforcement members of the vehicle front structure of the first embodiment of the invention.
Figure 8B:
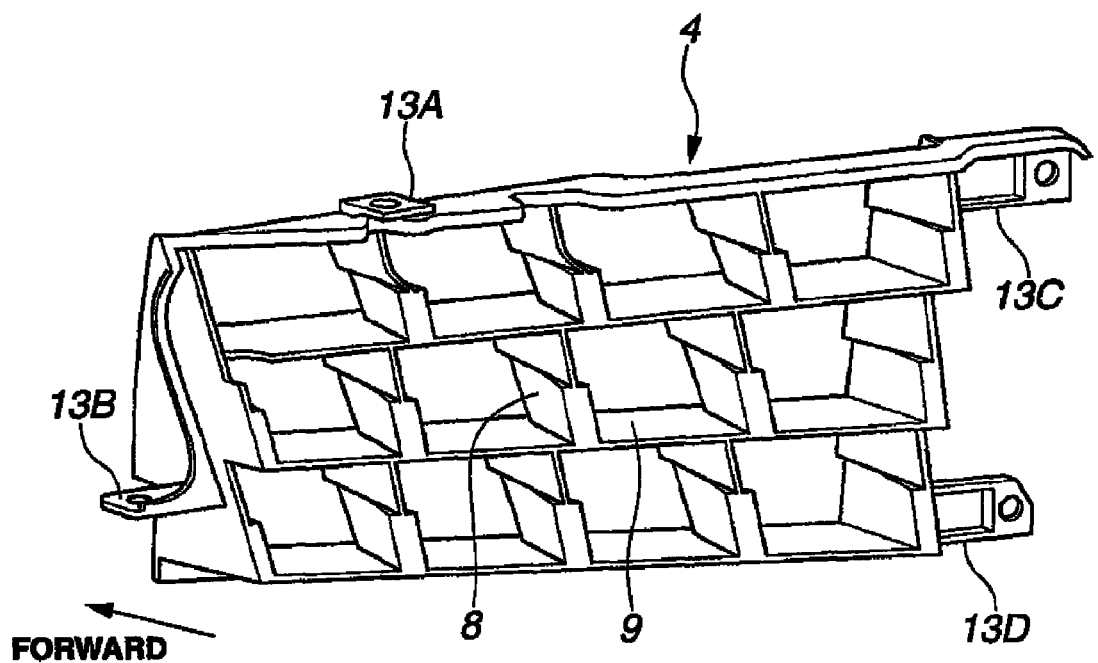

As shown in FIG. 8A, FIG. 8B, and FIG. 9, the right and left grille reinforcement members 4 each have a grid shape having vertical bridges 8 and lateral bridges 9. The right and left grille reinforcement members 4 are formed as rectangular bodies that are respectively substantially the same in outer shape as the left and right portions of grille 2. The vertical bridges 8 and the lateral bridges 9 are respectively located corresponding to vertical bridges 2A and lateral bridges 2B of the grille 2. The vertical bridges 8 and the lateral bridges 9 cooperate with each other to guide the outside air introduced from the grille 2 into the engine compartment. The lateral bridges 9 substantially horizontally extend in the width direction of the vehicle. In contrast, the vertical bridges 8 each extend between upper and lower lateral bridges 9 disposed in a height direction of the vehicle, and connect the upper and lower lateral bridges 9. Each vertical bridge 8 is also inclined with respect to the lateral bridge 9 such that an upper side of the vertical bridge 8 is directed toward an outside of the vehicle in the width direction of the vehicle.

Figure 12:
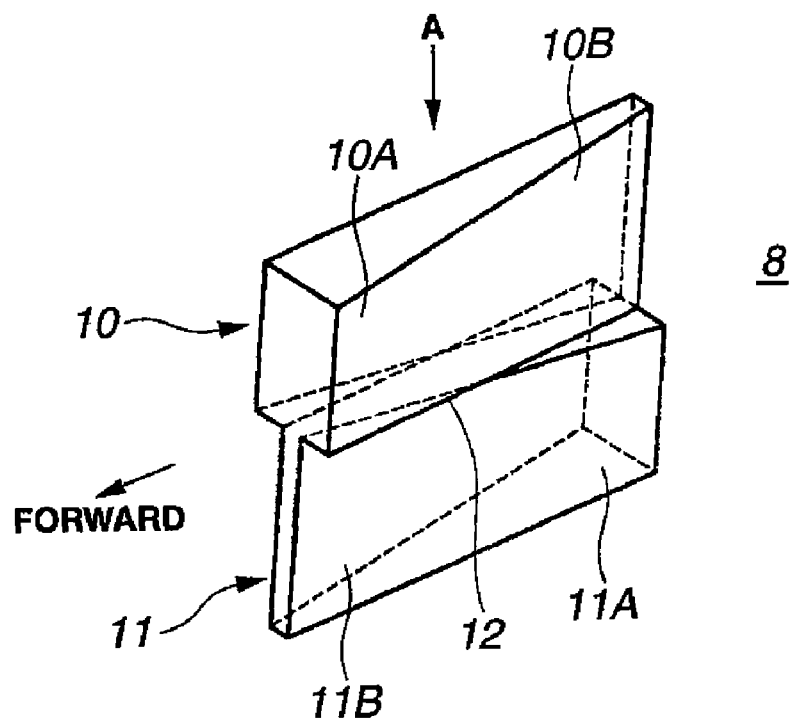
FIG. 12 is an enlarged perspective view of the vertical bridge of the grille reinforcement member of the vehicle front structure of the first embodiment of the invention.
Figure 13:
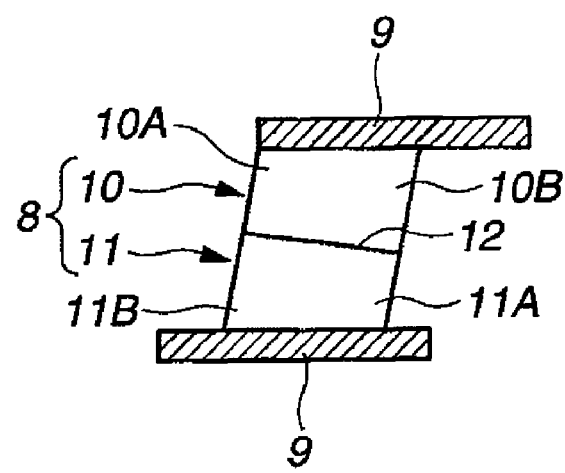
FIG. 13 is an enlarged side view of a part of the grille reinforcement member of the vehicle front structure of the first embodiment of the invention.

Each of the grille reinforcement members 4 has a turn accelerator that allows the vertical bridge 8 and the lateral bridge 9 to turn when an external force is applied to the fascia 1 from a forward direction of the vehicle. As shown in FIG. 12 and FIG. 13, the turn accelerator is a vertical bridge structure having a vertical bridge upper portion 10 and a vertical bridge lower portion 11 respectively disposed on an upper portion and a lower portion of vertical bridge 8. The vertical bridge upper portion 10 has a high strength portion 10A on a front side thereof in the fore-and-aft direction of the vehicle, and a fragile portion 10B on a rear side thereof in the fore-and-aft direction of the vehicle. The vertical bridge lower portion 11 has a high strength portion 11A and a fragile portion 11B that are respectively arranged opposite to the fragile portion 10B and the high strength portion 10A of the vertical bridge upper portion 10 in the fore-and-aft direction of the vehicle. That is, the high strength portion 11A is disposed on a rear side of the vertical bridge lower portion 11 in the fore-and-aft direction of the vehicle, and the fragile portion 11B is disposed on a front side of the vertical bridge lower portion 11 in the fore-and-aft direction of the vehicle. Each of the vertical bridge upper portion 10 and the vertical bridge lower portion 11 has a generally trapezoidal shape in plan view when viewed from a direction of arrow A as indicated in FIG. 12. That is, the vertical bridge upper portion 10 and the vertical bridge lower portion 11 have a thickness that gradually increases from one side toward the other side in the fore-and-aft direction of the vehicle. The vertical bridge upper portion 10 and the vertical bridge lower portion 11 are located in a rotationally opposite relation to each other, angularly offset from each other by 180 degrees. A thickness boundary portion 12 is disposed between the vertical bridge upper portion 10 and the vertical bridge lower portion 11.

The high strength portions 10A and 11A are respectively larger in thickness than fragile portions 10B and 11B. In other words, the fragile portions 10B and 11B are respectively smaller in thickness than high strength portions 10A and 11A. With this construction of the high strength portions 10A and 11A and the fragile portions 10B and 11B, when an external force applied to the fascia 1 is transmitted to the vertical bridge upper portion 10, the thinned fragile portion 10B on the rear side of the vehicle becomes more deformable than the high strength portion 10A on the front side of the vehicle. On the other hand, when the external force applied to the fascia 1 is transmitted to the vertical bridge lower portion 11, the thinned fragile portion 11B on the front side of the vehicle becomes more deformable than the high strength portion 11A on the rear side of the vehicle.

Further, the turn accelerator further facilitates the turn of the vertical bridge 8. Specifically, the thickness boundary portion 12 between the vertical bridge upper portion 10 and the vertical bridge lower portion 11 that are different in thickness from each other is configured such that the fragile portions 10B and 11B are respectively increased in area compared to the high strength portions 10A and 11A. In the first embodiment, the thickness boundary portion 12 is inclined such that a rear side thereof is lower than a front side thereof. Because of the inclination of thickness boundary portion 12, the area of the fragile portion 10B on the rear side of the vertical bridge upper portion 10 and the area of the fragile portion 11B on the front side of the vertical bridge lower portion 11 are increased.

Further, each of the grille reinforcement members are configured to gradually project in the forward direction of the vehicle such that a lowest portion thereof in a height direction of the vehicle is located in the most forwardly projecting position. Specifically, in the first embodiment, the lateral bridge 9 that is disposed on the lower side of the vehicle is located more forwardly than the lateral bridge 9 that is disposed on the upper side of the vehicle.

Further, as shown in FIG. 6, each of the grille reinforcement members 4 includes four support portions 13A-13D which are supported by the fascia 1. A first support portion 13A is disposed on the lateral bridge 9 that is located in an upper-most position in the height direction of the vehicle. The first support portion 13A is mounted to an upper portion of the fascia 1 by means of a first screw 14A, which is a tightening member. A second support portion 13B is disposed on the vertical bridge 8 that is located in an outer-most position in the width direction of the vehicle. The second support portion 13B is mounted to a rib 15 that is formed on the rear surface 1a of the fascia 1 by means of a second screw 14B.

The rib 15 is disposed at a boundary portion between the grille 2, a lamp mounting portion 16 and a bumper 17. Since the grille 2 is formed into a grid shape, the grille reinforcement member 4 is fixed to the bumper 17 through the boundary portion in an overhung (cantilever) state. The boundary portion, therefore, tends to suffer from stress concentration. The rib 15 serves as a reinforcing rib for the boundary portion. Further, the rib 15 projects from the rear surface 1a of the fascia 1 toward the rear side of the vehicle so as to continuously connect with the lateral bridge 2B of the grille 2 or the lateral bridge 9 of the grille reinforcement member 4. Thus, the rib 15 has an improved function as a reinforcing rib.

A third support portion 13C and a fourth support portion 13D are disposed on the inner-most vertical bridge 8 of the grille reinforcement member 4 and are respectively mounted to the rear surface 1a of the fascia 1 by means of a third screw 14C and a fourth screw 14D. The third support portion 13C extends from the upper-most lateral bridge 9 of the grille reinforcement member 4 in the width direction of the vehicle. Similarly, the fourth support portion 13D extends from the lower-most lateral bridge 9 in the width direction of the vehicle.

The grille reinforcement member 4 is mounted to the fascia 1 at the first support portion 13A and the second support portion 13B through the first screw 14A and the second screw 14B, and fastened at the third support portion 13C and the fourth support portion 13D through the third screw 14C and the fourth screw 14D together with the ornament supporting portion 5 of the fascia 1 and the ornament member 23.

Figure 11A:
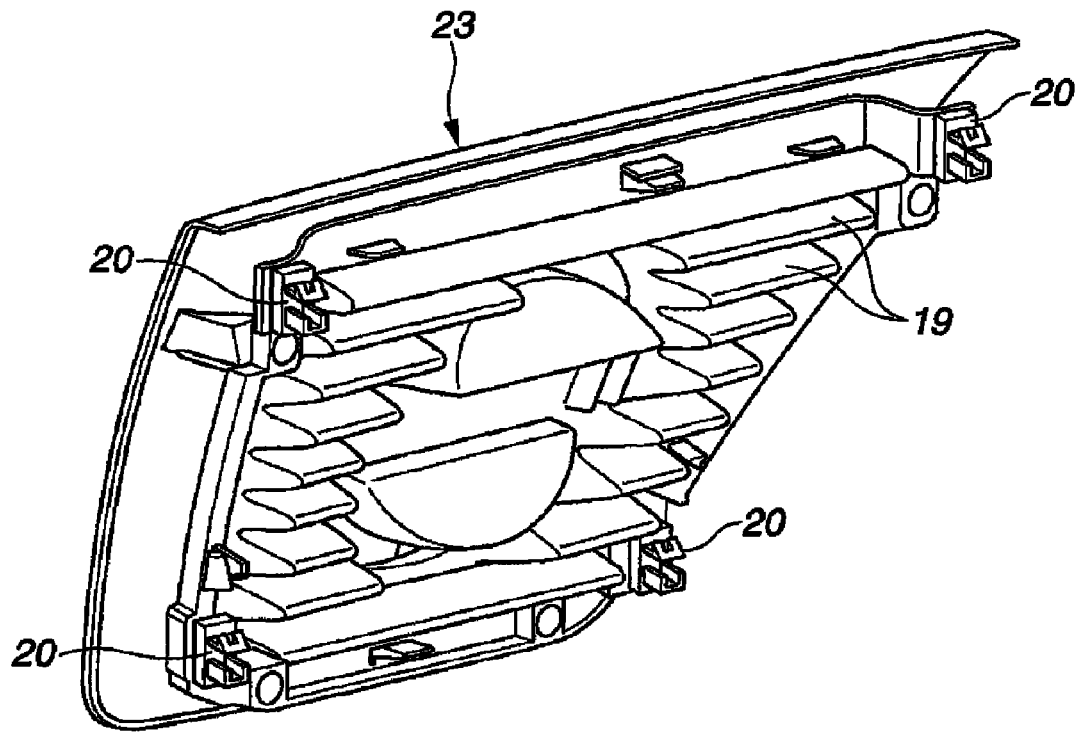
FIG. 11A and FIG. 11B are perspective views of the ornament supporting member of the vehicle front structure of the first embodiment of the invention.
Figure 11B:
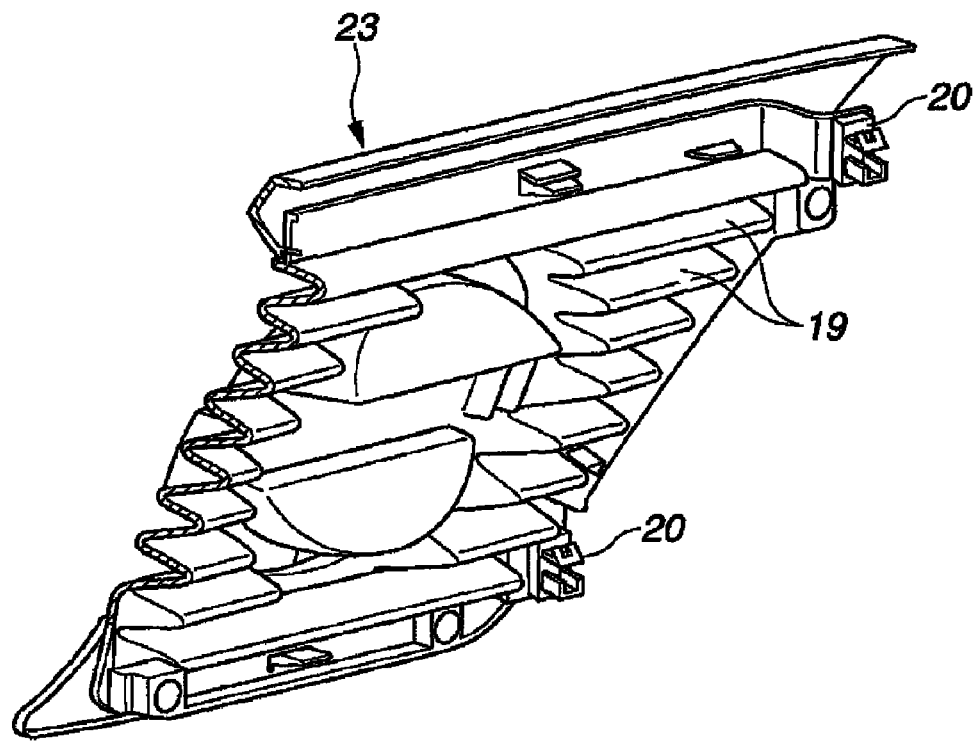

As shown in FIG. 11A and FIG. 11B, the ornament member 23 is provided with a plurality of projections 19 that enhance the rigidity and protect sensors that are disposed behind the ornament member 23. The projections 19 extend in the width direction of the vehicle and have a corrugated shape in a section taken in the fore-and-aft direction of the vehicle. Further, the ornament member 23 has screw mounting portions 20 at four corners thereof in which the ornament member 23, the grille 2, and the grille reinforcement member 4 are co-fastened to the fascia 1 by screws.

Figure 14A:
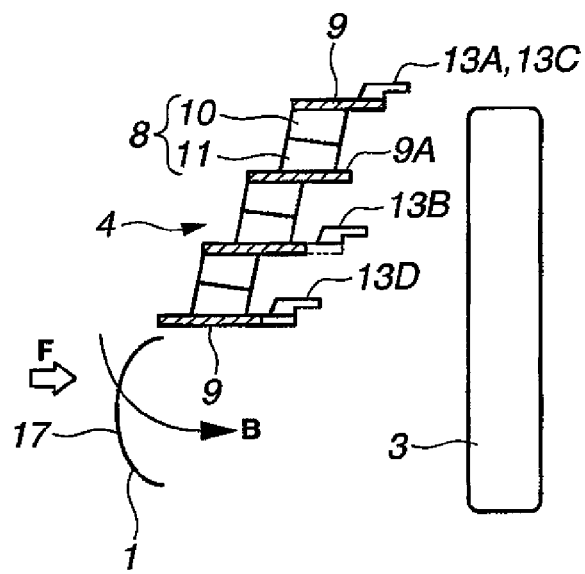
FIG. 14A to FIG. 14D are diagrams showing the grille reinforcement member of the vehicle front structure of the first embodiment of the invention being collapsed during a collision.

Next, the behavior of the grille reinforcement member 4 upon applying an external force to the vehicle front structure from the forward direction of the vehicle is explained. As shown in FIG. 14A, when external force F is applied from the forward direction of the vehicle to the bumper 17 disposed in the most forward position of the vehicle and below the grille reinforcement member 4, the fascia 1 is deformed and the grille reinforcement member 4 is turned downwardly as indicated by arrow B in FIG. 14A.

Figure 14B:
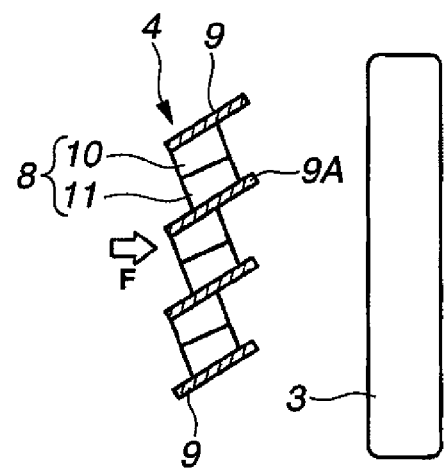

After the grille reinforcement member 4 is downwardly turned by external force F, the support portions 13A to 13D are broken and the grille reinforcement member 4 is moved toward an inside of the engine compartment, as shown in FIG. 14B. At this time, the lateral bridge 9 extending substantially horizontally is inclined in such a manner that the front side thereof is directed downwardly due to the turning of the grille reinforcement member 4.

Figure 14C:
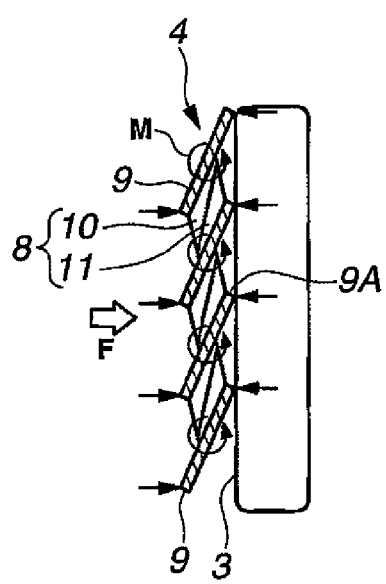

Next, the grille reinforcement member 4 is brought into a sandwiched state between the fascia 1 and the heat exchanger 3. As shown in FIG. 14C, the lateral bridge 9 undergoes a rotation moment M which moves the rear end portion 9A of the lateral bridge 9 upwardly. Further, a space between the upper and lower lateral bridges 9 is reduced and the vertical bridge 8 undergoes a force exerted in a direction which compress the vertical bridge 8 in the up-and-down direction. Here, the up-and-down direction is for the state before the grille reinforcement member 4 is turned by external force F. Due to the compression force, the fragile portions 10B and 11B of the vertical bridge 8 are deformed, either collapsed or buckled, and the turning of the lateral bridge 9 in the direction in which the rear end portion 9A of the lateral bridge 9 is forced to move upwardly is accelerated.

Figure 16:
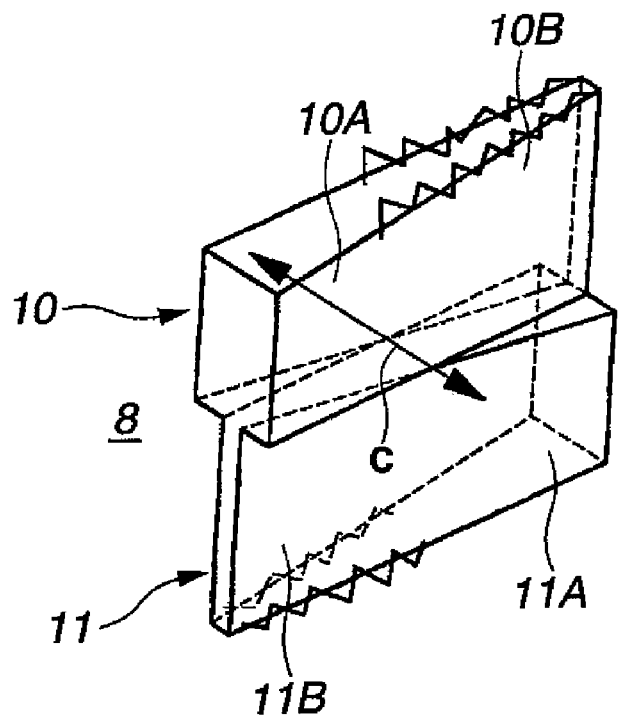
FIG. 16 is a diagram showing breaking of a part of the vertical bridge of the grille reinforcement member of the vehicle front structure of the first embodiment of the invention during a collision.

In addition, since a contact portion between the fragile portions 10B, 11B of the vertical bridge 8 and the lateral bridge 9 as indicated by a wave line in FIG. 16 are smaller in area than a contact portion between the high strength portion 10A, 11A of the vertical bridge 8 and the lateral bridge 9, the contact portion between the fragile portions 10B, 11B and the lateral bridge 9 is easy to break away. Because of the breaking-away of the contact portion between the fragile portions 10B, 11B and the lateral bridge 9, the fragile portions 10B, 11B of the vertical bridge 8 become further deformable to thereby further accelerate the turning of the lateral bridge 9 in the direction in which the rear end portion 9A of the lateral bridge 9 is forced to move upwardly.

Figure 14D:
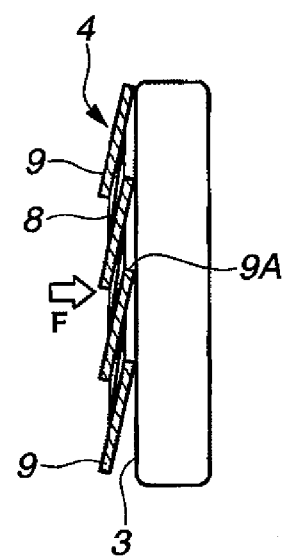
Figure 15:
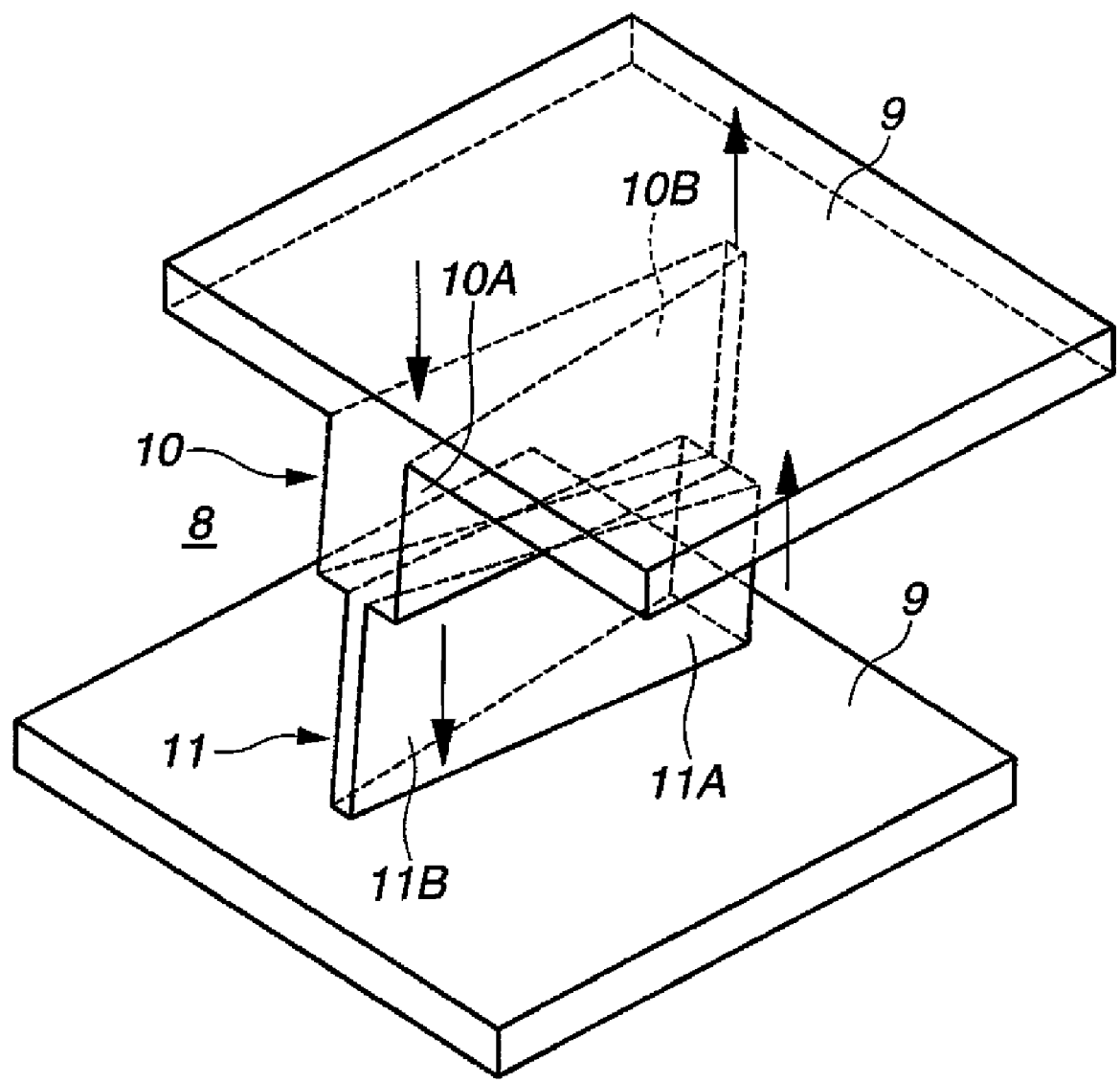
FIG. 15 is a diagram showing a direction of a force that is applied to the grille reinforcement member of the vehicle front structure of the first embodiment of the invention during a collision.

Finally, as shown in FIG. 14D, the high strength portions 10A and 11A of the vertical bridge 8 are deformed while absorbing energy that is generated by external force F. The lateral bridge 9 that is kept in the substantially horizontal state before application of external force F is turned so as to reduce a width of grille reinforcement member 4 in the fore-and-aft direction of the vehicle. Therefore, even when the lateral bridge 9 is moved while keeping the substantially horizontal state and the rear end portion 9A is brought into contact with the heat exchanger 3, the grille reinforcement member 4 can absorb the external force applied thereto from the forward direction of the vehicle. Accordingly, damage to the heat exchanger 3 resulting from its contact with grille reinforcement members 4 can be reduced.

According to the thus-constructed vehicle front structure, when the external force is applied to the grille reinforcement member 4 of the vehicle front structure from the forward direction of the vehicle, the vertical bridge 8 is deformed such that lateral bridge 9 can be turned. Therefore, even when the rear end portion 9A of the lateral bridge 9 comes in contact with the heat exchanger 3 or another a part disposed within the engine compartment, the grille reinforcement member 4 can absorb the external force and reduce damage to the parts within the engine compartment which would result from contact with the grille reinforcement member 4.

Further, according to the vehicle front structure of the first embodiment, with the arrangement of the grille reinforcement member 4 near the grille 2 and on the front side of the parts within the engine compartment, the parts within the engine compartment (for example, condenser 3A and radiator 3B) can be invisible from the grille 2, enhancing the appearance from the front side of the vehicle.

Further, according to the vehicle front structure of the first embodiment when external force F is applied to the vehicle front structure from the forward direction of the vehicle, the fragile portion 10B of the vertical bridge upper portion 10 and the fragile portion 11B of the vertical bridge lower portion 11 of the turn accelerator of each of the grille reinforcement members 4 can be deformed earlier than the high strength portion 10A of the vertical bridge upper portion 10 and the high strength portion 11A of the vertical bridge lower portion 11. As a result, the turning motion of the lateral bridge 9 can be accelerated.

Further, according to the vehicle front structure of the first embodiment, because of the thickness boundary portion 12 of the turn accelerator of the grille reinforcement member 4, the fragile portions 10B and 11B are increased in area compared to the high strength portions 10A and 11A. Therefore, the vertical bridge upper portion 10 and the vertical bridge lower portion 11 can be easily deformed and accelerate the turning motion of the lateral bridge 9.

Further, according to the vehicle front structure of the first embodiment, the bumper 17 is provided below the grille reinforcement members 4 and located in the most-forward position in the fascia 1 in the fore-and-aft direction of the vehicle. Therefore, the external force that is applied to the vehicle front structure from the forward direction of the vehicle can be applied to the bumper 17 prior to the grille reinforcement member 4 and cause the fascia 1 as a whole to turn about an upper portion thereof. With the turning of the fascia 1, the grille reinforcement member 4 is caused to turn such that the rear end portion 9A of the lateral bridge 9 is moved upwardly. As a result, the turning motion of the lateral bridge 9 can be further accelerated.

Further, according to the vehicle front structure of the first embodiment, the vertical bridges 8 of the left and right grille reinforcement members 4 are inclined toward the outside of the vehicle in the width direction of the vehicle. With this arrangement, it is possible to facilitate deforming the respective grille reinforcement members 4 to expand the respective grille reinforcement members 4 toward the outside of the vehicle in the width direction of the vehicle. Therefore, the left and right grille reinforcement members 4 can be prevented from being deformed toward the inside of the vehicle in the width direction of the vehicle which would cause interference with the deformation toward the outside of the vehicle.

Further, according to the vehicle front structure of the first embodiment, each of the grille reinforcement member 4 is formed as a separate part independent of the fascia 1 and arranged on the rear surface of the grille 2. With this arrangement of the grille reinforcement members 4, parts within the engine compartment can be invisible from the grille 2.

Further, according to the vehicle front structure of the first embodiment, the ornament 23 having enhanced rigidity, the ornament supporting portion 5 of the fascia 1, and the grille reinforcement members 4 are co-fastened by screws. As a result, the rigidity of the vehicle front structure in the width direction of the vehicle can be further enhanced.

Further, according to the grille reinforcement member 4 of the first embodiment, when external force F is applied to the grille reinforcement member 4 from the forward direction of the vehicle, the fragile portion 10B of the vertical bridge upper portion 10 and the fragile portion 11B of the vertical bridge lower portion 11 can respectively be deformed earlier than the high strength portion 10A of the vertical bridge upper portion 10 and the high strength portion 11A of the vertical bridge lower portion 11. As a result, the turning motion of the lateral bridge 9 can be accelerated.

Furthermore, according to the grille reinforcement member 4 of the first embodiment, because of the thickness boundary portion 12, the fragile portions 10B and 11B are increased in area compared to the high strength portions 10A and 11A. Therefore, the vertical bridge upper portion 10 and the vertical bridge lower portion 11 can be easily deformed to thereby accelerate the turning motion of the lateral bridge 9.

Although in the first embodiment, the bumper 17 of the fascia 1, the most-forwardly projecting portion of the vehicle, is disposed on a lower side of the grille reinforcement member 4, the arrangement of the bumper 17 is not thus limited. The bumper 17 can, for example, be disposed on an upper side of the grille reinforcement member 4. In such a case, it is possible to obtain the same effect as in embodiment.

Figure 17:
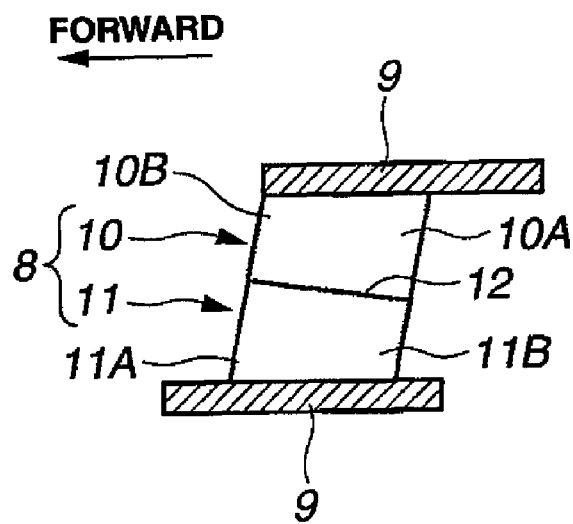
FIG. 17 is an enlarged side view of a part of the grille reinforcement member of the vehicle front structure of a second embodiment of the invention.
Figure 18:
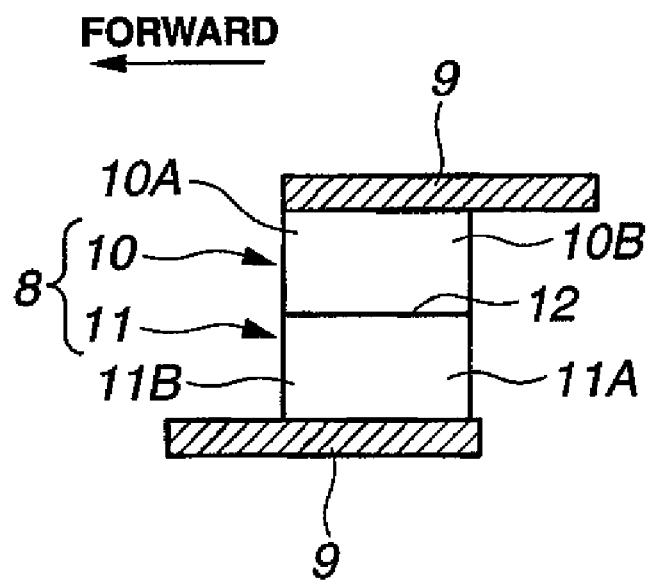
FIG. 18 is an enlarged side view of a part of the grille reinforcement member of the vehicle front structure of the second embodiment of the invention wherein the fragile portions and the high strength portions are equal in area to each other.
Figure 19:
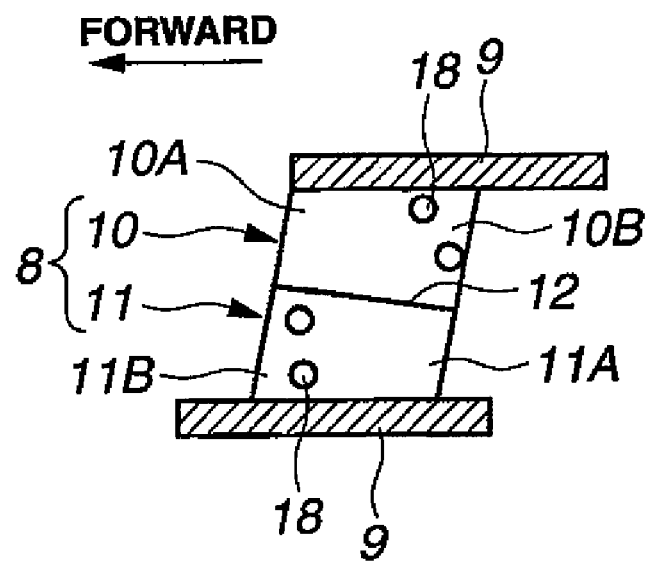
FIG. 19 is an enlarged side view of a part of the grille reinforcement member of the vehicle front structure of the second embodiment of the invention with through-holes formed in the fragile portions of the upper portion and the lower portion of the vertical bridge.

FIG. 17 to FIG. 19 show a vehicle front structure of a second embodiment of the invention. As shown in FIG. 17, in contrast to the first embodiment, the fragile portion 10B and the high strength portion 10A are respectively disposed on the front side and the rear side of the vertical bridge upper portion 10 in the fore-and-aft direction of the vehicle and the high strength portion 11A and the fragile portion 11B are respectively disposed on the front side and the rear side of the vertical bridge lower portion 11 in the fore-and-aft direction of the vehicle. The vertical bridge 8 of the second embodiment works similar to the first embodiment, and have similar advantages as the first embodiment.

As shown in FIG. 18, the thickness boundary portion 12 is horizontally formed. In this case, the thickness boundary portion 12 allows a reduced degree of deformation of the vertical bridge 8 compared to the thickness boundary portion 12 of the first embodiment.

As shown in FIG. 19, the fragile portion 10B of the vertical bridge upper portion 10 and the fragile portion 11B of the vertical bridge lower portion 11 are lowered in rigidity not by reducing the thickness compared to the high strength portions 10A and 11A, but instead, by forming through-holes 18 or slits in the fragile portions 10B and 11B. In this case, the vertical bridge upper portion 10 and the vertical bridge lower portion 11 have a uniform thickness from the front side toward the rear side in the fore-and-aft direction of the vehicle.

FIGS. 20A-20D show a vehicle front structure of a third embodiment of the invention which differs from the first embodiment in the arrangement of the support portions 13A, 13B of the grille reinforcement member 4 and a projecting portion 21. In the third embodiment the support portions 13A, 13B are provided only on the upper side of the grille reinforcement member 4. Further, instead of the projecting portion 17 formed in the fascia 1, a projecting portion 21 projecting in the forward direction of the vehicle is provided on the lower side of the grille reinforcement member 4 which lacks the support portion 13A.

Figure 20A:
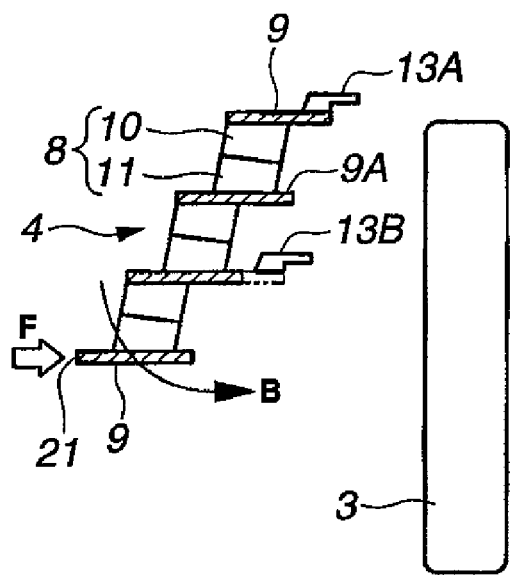
FIG. 20A to FIG. 20D are diagrams showing collapsing of the grille reinforcement member of the vehicle front structure of a third embodiment of the invention during a collision.
Figure 20B:
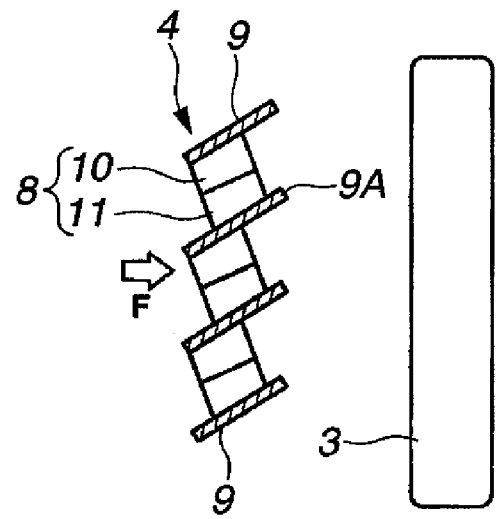
Figure 20C:
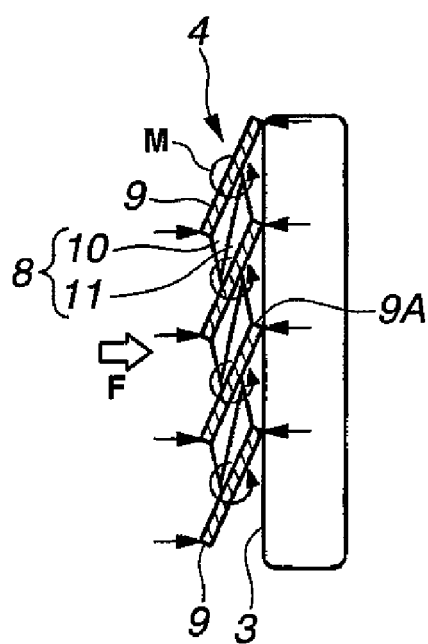
Figure 20D:
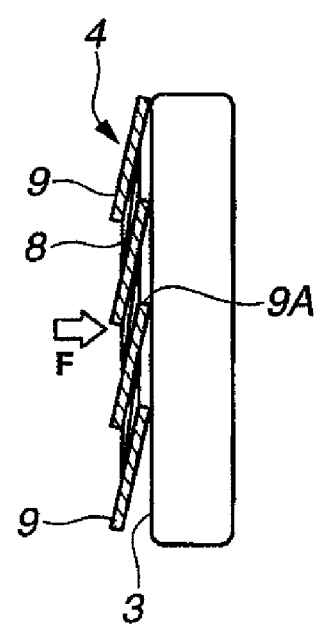

As shown in FIG. 20A, when external force F is directly applied to the projecting portion 21 on a side of a lower end of grille reinforcement member 4, the grille reinforcement member 4 is downwardly turned about first support portion 13A and the second support portion 13B as indicated by arrow B. Subsequently, as shown in FIG. 20B, the first support portion 13A and the second support portion 13B are broken and the grille reinforcement member 4 is moved toward an inside of the engine compartment, similar to the first embodiment. The grille reinforcement member 4 as a whole is then turned such that the lateral bridge 9 is inclined to direct the front side downwardly. Next, as shown in FIG. 20C, rotation moment M is exerted on the lateral bridge 9 and then transmitted from the lateral bridge 9 to the vertical bridge 8. Finally, as shown in FIG. 20D, the vertical bridge 8 is deformed so that the turning motion of the lateral bridge 9 is accelerated and the energy produced by external force F is absorbed.

Figure 21:
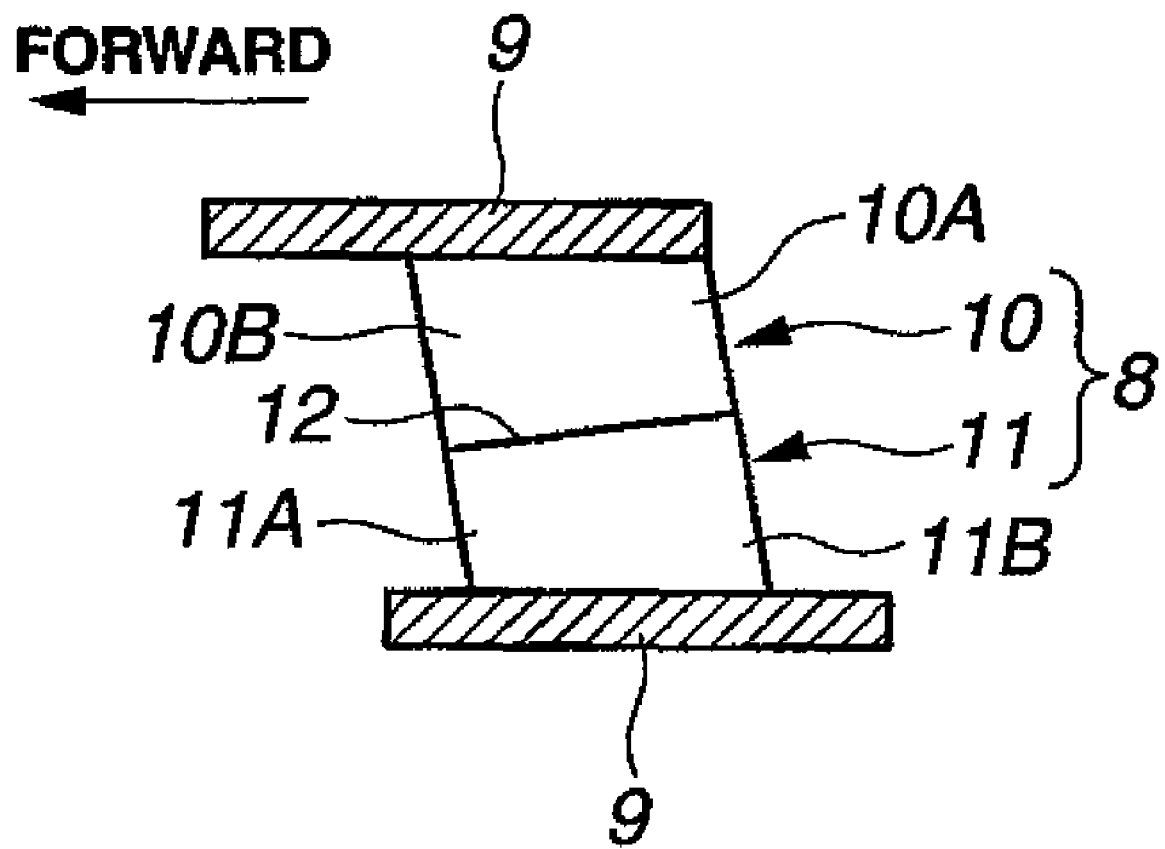
FIG. 21 is an enlarged side view of a part of the grille reinforcement member of the vehicle front structure of a fourth embodiment of the invention.

FIG. 21 and FIGS. 22A-22D show a vehicle front structure of a fourth embodiment of the invention. The fourth embodiment differs from the first embodiment in the arrangement of the support portions 13A and 13B of the grille reinforcement member 4 and a projecting portion 22. Specifically, the support portions 13A and 13B are provided on only the lower side of the grille reinforcement member 4. Further, instead of the projecting portion 17 formed in the fascia 1, the projecting portion 22 projecting in the forward direction of the vehicle is provided on the upper side of the grille reinforcement member 4 which lacks the support portion 13A. Further, the fourth embodiment differs from the first and third embodiments in the arrangement of the fragile portions 10B and 11B and the high strength portions 10A and 11A. Specifically, as shown in FIG. 21, the fragile portion 10B and the high strength portion 10A are respectively disposed on the front side and the rear side of the vertical bridge upper portion 10 in the fore-and-aft direction of the vehicle and the high strength portion 11A and fragile portion 11B are respectively disposed on the front side and the rear side of vertical bridge lower portion 11 in the fore-and-aft direction of the vehicle.

Figure 22A:
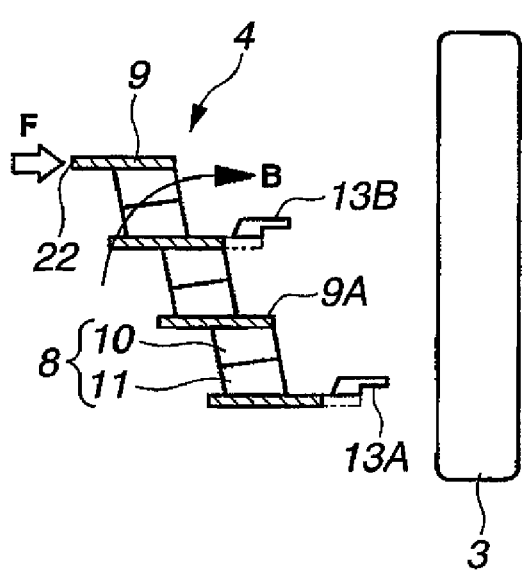
FIG. 22A to FIG. 22D are diagrams showing collapsing of the grille reinforcement member of the vehicle front structure of the fourth embodiment of the invention during a collision.
Figure 22B:
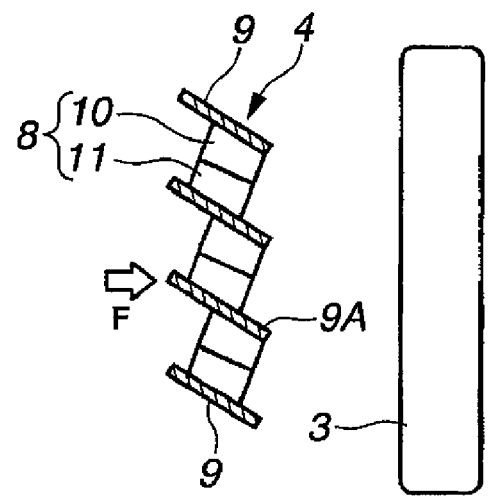
Figure 22C:
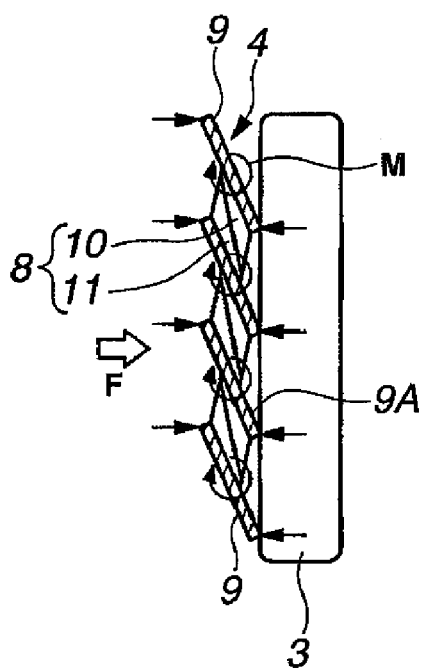
Figure 22D:
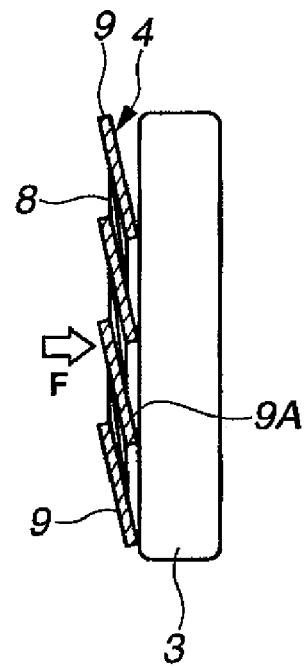

As shown in FIG. 22A, when external force F is directly applied to the projecting portion 22 on a side of an upper end of the grille reinforcement member 4, the grille reinforcement member 4 is upwardly turned about first support portion 13A and second support portion 13B as indicated by arrow B. Subsequently, as shown in FIG. 22B, the first support portion 13A and the second support portion 13B are broken and the grille reinforcement member 4 is moved toward an inside of the engine compartment, similar to the first embodiment. The grille reinforcement member 4 as a whole is then turned such that the lateral bridge 9 is inclined to direct the front side upwardly. Next, as shown in FIG. 22C, rotation moment M is exerted on the lateral bridge 9 and then transmitted from the lateral bridge 9 to the vertical bridge 8. Finally, as shown in FIG. 22D, the vertical bridge 8 is deformed so that the turning motion of the lateral bridge 9 is accelerated and the energy produced by external force F is absorbed.

Figure 23:
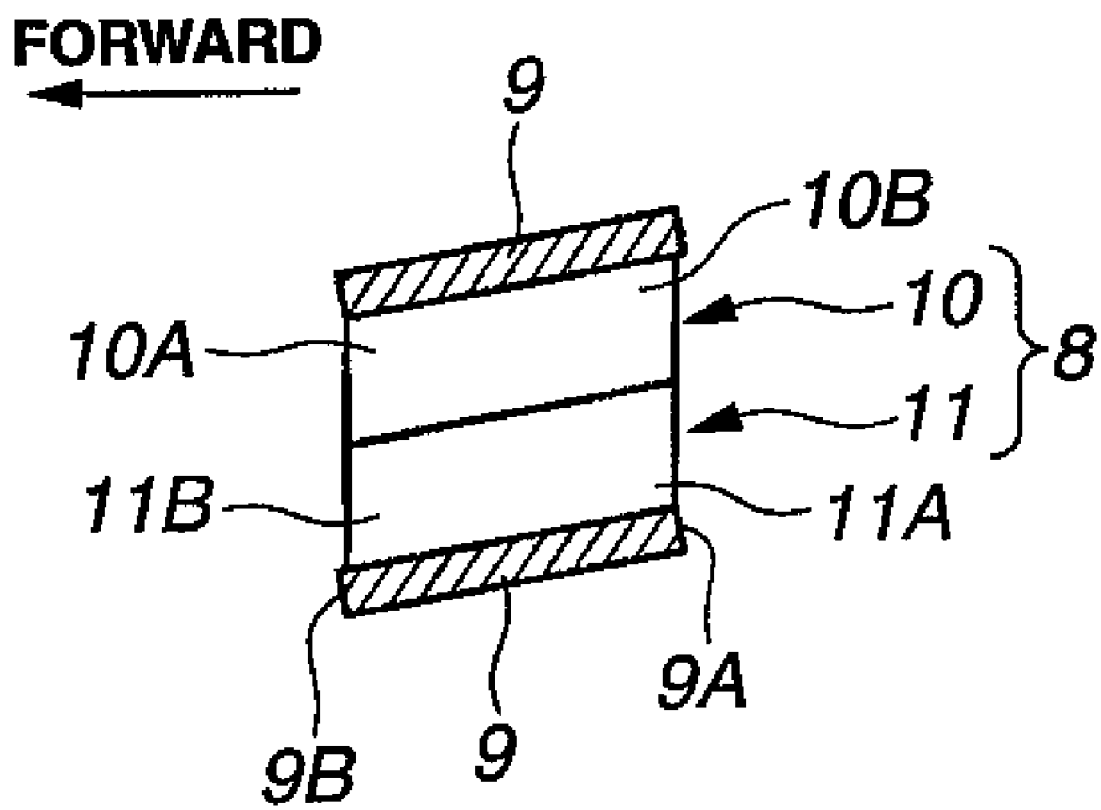
FIG. 23 is an enlarged side view of a part of the grille reinforcement member of the vehicle front structure of a fifth embodiment of the invention showing a lateral bridge inclined.
Figure 24A:
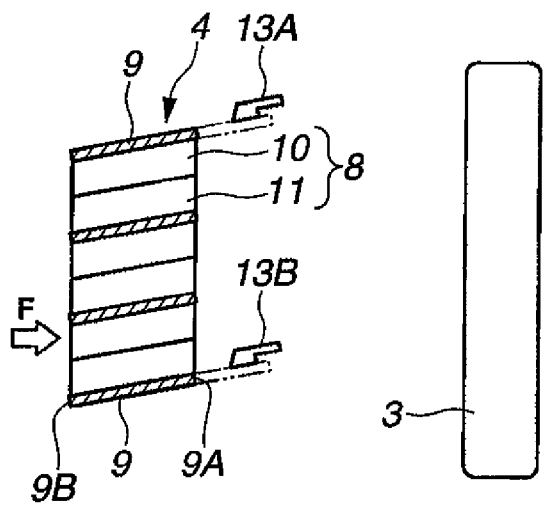
FIG. 24A to FIG. 24D are diagrams showing collapsing of the grille reinforcement member of the vehicle front structure of the fifth embodiment of the invention during a collision.
Figure 24B:
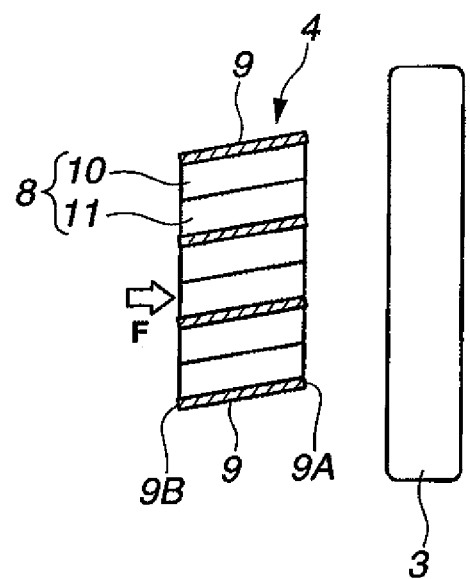
Figure 24C:
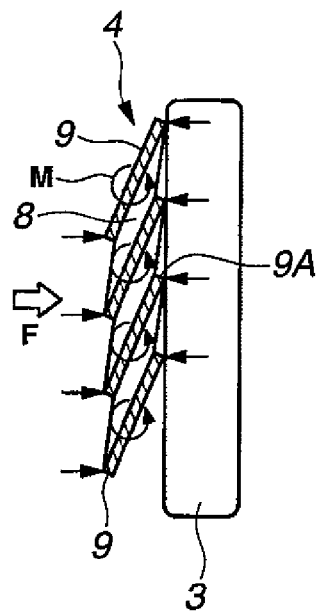
Figure 24D:
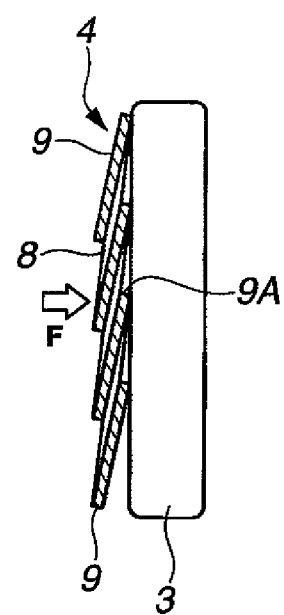

FIG. 23 to FIG. 24D show a vehicle front structure of a fifth embodiment of the invention. The fifth embodiment differs from the first, third and fourth embodiments in using grille reinforcement member 4 with inclined lateral bridge 9. In the fifth embodiment, when external force F is applied to the vehicle front structure, the vertical bridge 8 is deformed to turn the lateral bridge 9 without turning the whole grille reinforcement member 4.

As shown in FIG. 23, the lateral bridge 9 is inclined to downwardly direct the front end 9B thereof in the fore-and-aft direction of the vehicle. Further, the lateral bridges 9 are arranged such that the front ends 9B and the rear ends 9A are respectively aligned in the height direction of the vehicle. Further, the fragile portion 10B and the high strength portion 10A are respectively disposed on the rear side and the front side of the vertical bridge upper portion 10 in the fore-and-aft direction of the vehicle, and the high strength portion 11A and the fragile portion 11B are respectively disposed on the rear side and the front side of the vertical bridge lower portion 11 in the fore-and-aft direction of the vehicle. Further, a ratio of the area occupied by the fragile portions 10B, 11B to the entire area of the vertical bridge 8 is equivalent to a ratio of the area occupied by the high strength portions 10A, 11A to the entire area of the vertical bridge 8.

As shown in FIG. 24A, the support portions 13A and 13B are respectively provided on the upper end portion and the lower end portion of the grille reinforcement member 4. The support portions 13A and 13B are fixed to the vehicle body. The front ends 9B of the lateral bridges 9 are located in the same plane that extends in the up-and-down direction of the vehicle. When external force F is directly applied to the grille reinforcement member 4 from the forward direction of the vehicle, the first support portion 13A and the second support portion 13B are broken and the grille reinforcement member 4 is horizontally moved toward an inside of the engine compartment as shown in FIG. 24B. Next, as shown in FIG. 24C, rotation moment M is exerted on the lateral bridge 9 and then transmitted from the lateral bridge 9 to the vertical bridge 8. Finally, as shown in FIG. 24D, the vertical bridge 8 is deformed so that the turning motion of the lateral bridge 9 is accelerated and the energy produced by external force F is absorbed.

In a sixth embodiment, a grid structure of the grille reinforcement member 4 of the first to fifth embodiments having the vertical bridge 8 and the lateral bridge 9 is applied to the grille 2 formed on the fascia 1.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A front structure for a vehicle, comprising:
a grid member configured to allow outside air to be introduced from a forward direction of the vehicle into a compartment of the vehicle; and
a part within the compartment disposed on a rear side of the grid member, wherein
the grid member comprises a plurality of first bridges and a plurality of second bridges intersecting with the first bridges, each of the first bridges comprises:
a bridge upper portion comprising a fragile portion on one of a front side thereof and a rear side thereof in a fore-and-aft direction of the vehicle, and
a bridge lower portion comprising a fragile portion on one of a front side thereof and a rear side thereof in the fore-and-aft direction, and
the fragile portion of the bridge upper portion and the fragile portion of the bridge lower portion are on opposite sides in the fore-and-aft direction, and are deformed so that a turning motion of each the second bridges in a direction which the second bridges are disposed is accelerated when an external force is applied to the grid member.

2. The front structure as claimed in claim 1, further comprising a thickness boundary portion formed between the bridge upper portion and the bridge lower portion, wherein the thickness boundary portion increases an area of each of the fragile portions.

3. The front structure as claimed in claim 1, wherein the grid member is mounted to a support member comprising a projecting portion disposed on one of an upper side of the grid member and a lower side of the grid member, the projection member projecting in the forward direction.

4. The front structure as claimed in claim 1, further comprising:
a support portion disposed on one of an upper side of the grid member and a lower side of the grid member and mounted to a support member, and
a projecting portion that projects on the other of the upper side of the grid member and the lower side of the grid member in the forward direction of the vehicle.

5. The front structure as claimed in claim 1, wherein
the plurality of first bridges comprise vertical bridges configured to deform by an external force applied thereto from the forward direction,
the plurality of second bridges comprise lateral bridges intersecting with the plurality of vertical bridges,
the grid member comprises a left grid member disposed on a left side of the vehicle and a right grid member disposed on a right side of the vehicle, arranged parallel to each other in a width direction of the vehicle, and
the plurality of vertical bridges are disposed inclined relative to the plurality of lateral bridges toward an outside of the vehicle in the width direction.

6. The front structure as claimed in claim 3, wherein the grid member is disposed on a rear surface of an outside air introducing portion disposed on a front side of the vehicle, and the grid member is formed separate from the support member.

7. The front structure as claimed in claim 5, wherein the grid member is mounted to a support member and wherein a central member having a strength higher than each of the left and right grid members is disposed between the left and right grid members, and the central member, the support member, and the left and right grid members are co-fastened by a tightening member.

8. The front structure as claimed in claim 2, wherein the grid member is mounted to a support member, and the support member comprises a projecting portion disposed on one of an upper side of the grid member and a lower side of the grid member and projects in the forward direction.

9. The front structure as claimed in claim 2, wherein the grid member comprises:
a support portion disposed on one of an upper side of the grid member and a lower side of the grid member and mounted to a support member, and
a projecting portion that projects on the other of the upper side of the grid member and the lower side of the grid member in the forward direction.

10. The front structure as claimed in claim 2, wherein
the plurality of first bridges comprise vertical bridges configured to deform by an external force applied thereto from the forward direction,
the plurality of second bridges comprise lateral bridges intersecting with the plurality of vertical bridges,
the grid member comprises a left grid member disposed on a left side of the vehicle and a right grid member disposed on a right side of the vehicle, arranged parallel to each other in a width direction of the vehicle, and
the plurality of vertical bridges are disposed inclined relative to the plurality of lateral bridges toward an outside of the vehicle in the width direction.

11. The front structure as claimed in claim 3, wherein
the plurality of first bridges comprise vertical bridges configured to deform by an external force applied thereto from the forward direction,
the plurality of second bridges comprise lateral bridges intersecting with the plurality of vertical bridges,
the grid member comprises a left grid member disposed on a left side of the vehicle and a right grid member disposed on a right side of the vehicle, arranged parallel to each other in a width direction of the vehicle, and
the plurality of vertical bridges are disposed inclined relative to the plurality of lateral bridges toward an outside of the vehicle in the width direction.

12. The front structure as claimed in claim 4, wherein
the plurality of first bridges comprise vertical bridges configured to deform by an external force applied thereto from the forward direction,
the plurality of second bridges comprise lateral bridges intersecting with the plurality of vertical bridges,
the grid member comprises a left grid member disposed on a left side of the vehicle and a right grid member disposed on a right side of the vehicle, arranged parallel to each other in a width direction of the vehicle, and
the plurality of vertical bridges are disposed inclined relative to the plurality of lateral bridges toward an outside of the vehicle in the width direction.

13. The front structure as claimed in claim 8, wherein
the plurality of first bridges comprise vertical bridges configured to deform by an external force applied thereto from the forward direction,
the plurality of second bridges comprise lateral bridges intersecting with the plurality of vertical bridges,
the grid member comprises a left grid member disposed on a left side of the vehicle and a right grid member disposed on a right side of the vehicle, arranged parallel to each other in a width direction of the vehicle, and
the plurality of vertical bridges are disposed inclined relative to the plurality of lateral bridges toward an outside of the vehicle in the width direction.

14. The front structure as claimed in claim 9, wherein
the plurality of first bridges comprise vertical bridge configured to deform by an external force applied thereto from the forward direction,
the plurality of second bridges comprise lateral bridges intersecting with the plurality of vertical bridges,
the grid member comprises a left grid member disposed on a left side of the vehicle and a right grid member disposed on a right side of the vehicle, arranged parallel to each other in a width direction of the vehicle, and
the plurality of vertical bridges are disposed inclined relative to the plurality of lateral bridges toward an outside of the vehicle in the width direction.

15. The front structure as claimed in claim 4, wherein the grid member is disposed on a rear surface of an outside air introducing portion disposed on a front side of the vehicle, and the grid member is formed separate from the support member.

16. The front structure as claimed in claim 5, wherein the grid member is disposed on a rear surface of an outside air introducing portion disposed on a front side of the vehicle, and the grid member is formed separate from the support member.

17. The front structure as claimed in claim 6, wherein the grid member comprises a left grid member and a right grid member and wherein a central member having a strength higher than each of the left and right grid members is disposed between the left and right grid members, and the central member, the support member, and the left and right grid members are co-fastened by a tightening member.

18. The front structure as claimed in claim 1, wherein the part within the compartment is a heat exchanger.

19. A grid member for a vehicle, comprising:
a plurality of first bridges; and
a plurality of second bridges intersecting with the plurality of first bridges, wherein each of the first bridges comprises:
    a bridge upper portion comprising a fragile portion on one of a front side thereof and a rear side thereof in a fore-and-aft direction of the vehicle, and
    a bridge lower portion comprising a fragile portion on one of a front side thereof and a rear side thereof in the fore-and-aft direction,
the fragile portion of the bridge upper portion and the fragile portion of the bridge lower portion are on opposite sides in the fore-and-aft direction, and are deformed so that a turning motion of each of the second bridges in a direction which the second bridges are disposed is accelerated when an external force is applied to the grid member.

20. A grid member for a vehicle, comprising:
a plurality of first bridge means for intersecting a plurality of second bridge means, wherein the first and second bridge means are disposed on a rear surface of a grid-shaped outside air introduction means,
wherein each of the first bridge means comprises:
    an upper portion including a fragile means on one of a front side thereof and a rear side thereof in a fore-and-aft direction of the vehicle, and
    a lower portion comprising a fragile means on the other of the front side thereof and the rear side thereof in the fore-and-aft direction, and
the fragile means of the bridge upper portion and the fragile means of the bridge lower portion are on opposite sides in the fore-and-aft direction, and are deformed so that a turning motion of each of the second bridges in a direction which the second bridges are disposed is accelerated when an external force is applied to the grid member.

21. A front structure for a vehicle, comprising:
a grid member configured to allow outside air to be introduced from a forward direction of the vehicle into a compartment of the vehicle; and
a part within the compartment disposed on a rear side of the grid member, wherein
the grid member comprises a plurality of first bridges and a plurality of second bridges intersecting with the first bridges,
each of the first bridges comprises a fragile portion configured to deform so that a turning motion of each of the second bridges in a direction which the second bridges are disposed is accelerated when an external force is applied to the grid member.

* * * * *